April 15, 1952 W. C. PALMER ET AL 2,592,726

WRAPPING MACHINE

Filed Nov. 24, 1948 13 Sheets-Sheet 1

INVENTORS
WILLIAM C. PALMER
ARTHUR A. KOTTMANN
BY Evans & McCoy
ATTORNEYS

WRAPPING MACHINE

Filed Nov. 24, 1948 13 Sheets-Sheet 2

INVENTORS
WILLIAM C. PALMER
ARTHUR A. KOTTMANN
BY Evans & McCoy
ATTORNEYS

April 15, 1952 W. C. PALMER ET AL 2,592,726

WRAPPING MACHINE

Filed Nov. 24, 1948 13 Sheets-Sheet 3

INVENTORS
WILLIAM C. PALMER
ARTHUR A. KOTTMANN
BY Evans & McCoy
ATTORNEYS

INVENTORS
WILLIAM C. PALMER
ARTHUR A. KOTTMANN
BY Evans & McCoy
ATTORNEYS

INVENTORS
WILLIAM C. PALMER
ARTHUR A. KOTTMANN
BY Evans & McCoy
ATTORNEYS

INVENTORS
WILLIAM C. PALMER
ARTHUR A. KOTTMANN
BY Evans & McCoy
ATTORNEYS

WRAPPING MACHINE

INVENTORS
WILLIAM C. PALMER
ARTHUR A. KOTTMANN
BY Evans & McCoy
ATTORNEYS

WRAPPING MACHINE

Filed Nov. 24, 1948 13 Sheets-Sheet 8

INVENTORS
WILLIAM C. PALMER
ARTHUR A. KOTTMANN
BY Evans + McCoy
ATTORNEYS

INVENTORS
WILLIAM C. PALMER
ARTHUR A. KOTTMANN
BY Evans & McCoy
ATTORNEYS

INVENTORS
WILLIAM C. PALMER
ARTHUR A. KOTTMANN
BY Evans & McCoy
ATTORNEYS

April 15, 1952 W. C. PALMER ET AL 2,592,726

WRAPPING MACHINE

Filed Nov. 24, 1948 13 Sheets-Sheet 11

INVENTORS
WILLIAM C. PALMER
ARTHUR A. KOTTMANN
BY *Evans & McCoy*
ATTORNEYS

INVENTORS
WILLIAM C. PALMER
ARTHUR A. KOTTMANN
BY Evans & McCoy
ATTORNEYS

WRAPPING MACHINE

Filed Nov. 24, 1948 13 Sheets-Sheet 13

INVENTORS
WILLIAM C. PALMER
ARTHUR A. KOTTMANN
BY Evans + McCoy
ATTORNEYS

Patented Apr. 15, 1952 2,592,726

UNITED STATES PATENT OFFICE 2,592,726

WRAPPING MACHINE

William C. Palmer and Arthur A. Kottmann, Davenport, Iowa, assignors to The Bettendorf Company, Bettendorf, Iowa, a corporation of Maryland Application November 24, 1948, Serial No. 61,784

13 Claims. (Cl. 53—111)

This invention relates to wrapping machines and more particularly to improvements in mechanisms for handling articles in wrapping machines of the type in which relatively soft deformable articles such as bread loaves are to be processed.

In machines of the character contemplated herein articles to be wrapped are introduced one at a time into the mechanism and associated with a web or piece of wrapping material that is draped over the article and folded thereabout as the article is advanced. Although articles are customarily fed into wrapping machines in a continuous succession, the wrapping of each article is accomplished by a series of operations that are performed one after another in a regular predetermined order. Since each article must undergo all of the steps or operations, some economy of time is effected and the wrapping capacity of the machine is increased by arranging the progression of the article through the mechanisms so as to have a plurality of articles "in process" at the same time. In other words, while one article is having the wrapping material folded against the ends of the article, a preceding article may be undergoing an operation to seal the overlapped wrapper portions, while a succeeding article may be having the wrapping material draped thereover in readiness for the folding of the wrapping material against the article ends. Some of the operations performed on articles being processed take longer than others, even though the operation may consist merely in transporting the article from one station or position to another. It is apparent, however, that the wrapping rate of the machine is limited by the time required to perform the longest operation.

It is therefore one of the principal aims of the present invention to provide a method of and apparatus for handling articles in a wrapping machine in such manner as to obtain a relatively high speed operation without resorting to objectionable accelerations or excessive linear speeds of movement of the articles. More specifically, the invention seeks to improve the handling of articles in wrapping machines of the type in which a plurality of articles are simultaneously undergoing wrapping operations. To this end the horizontal and vertical movements of the articles are segregated and are performed alternately. That is to say, while articles are being moved vertically in the machine, all articles on horizontal portions of the article path through the machine are motionless and, while articles are moving horizontally, no vertical movement of articles takes place.

As a further object the invention contemplates the improvement of the article handling method and apparatus to the end that the article advancing mechanisms are so timed that all of the instrumentalities for moving articles over horizontal path portions are energized and operate simultaneously, while all instrumentalities for advancing articles over vertical path portions operate simultaneously. By this arrangement the articles are advanced through the mechanisms step by step, horizontal movements alternating with vertical movements.

A further object of the invention relates to the driving means for providing the step by step movement of the articles and aims to provide an intermittent drive in which each movement of an article is initiated gradually and terminated gradually to avoid abrupt starts and stops. As a preferred embodiment of this feature of the invention there is provided a plurality of overrunning drives which are alternately energized from a common drive source so that while the prime mover may supply a substantially uniform flow of power into the machine such power is utilized first by one set or group of article advancing or handling mechanisms and then by another group.

A still further object of the invention is directed to features by means of which a machine is adjusted to wrap articles having different sizes. The desirability of reducing the number of adjustments required in changing a wrapping machine from one article size to another has previously been recognized. Machines have been made in which several sets of guides, folders, sealers and the like are coupled together for simultaneous actuation. The machine of the present invention provides for adjustment over an unusually large size range without sacrificing control over the articles being processed and while yet maintaining a high efficiency and superb wrapping quality. Adjustment to accommodate articles of different sizes is effected through a single master control which simultaneously and uniformly adjusts all instrumentalities in unison. In a machine of the present character, in which two article lifting carriers or elevators are employed, the provision of a single master control for effecting article size adjustment is particularly advantageous. Such single control avoids miswraps and "cripples" which are almost certain to occur should there be a failure to adjust one of the article receiving instrumentalities when a size change is made in the remainder of the machine.

The size adjustment aspect of the present invention includes provision for altering the settings of the several instrumentalities of the machine while the apparatus is in continuous operation. This is an advantageous feature because the wrapping machine need not be shut down for change-over between different production runs and more efficient operation results. Furthermore the adjustment to different article sizes, when made while the machine is in operation, enables the operator to observe the effect of the size change on the character of wrap produced. This is particularly useful in wrapping machines which handle articles such as bread that, while nominally of the same size, may differ from day to day on account of different baking conditions, ingredients and other variable factors.

Additional objects of the invention relate to improvements in various mechanisms and instrumentalities of the present type of wrapping machine which will become apparent as the description proceeds. Such improvements are directed to the wrapping material feeding and cut-off mechanisms, the means for receiving and holding the severed wrapping material, the mounting of the folding members of the folding and sealing channel, and the general simplification of construction, arrangement of parts, safety provisions, and economy of manufacture. The description of the invention is made in connection with the accompanying drawings forming a part of the specification and in which like parts throughout the several views are indicated by the same letters and numerals of reference.

Figures 12, 12A:
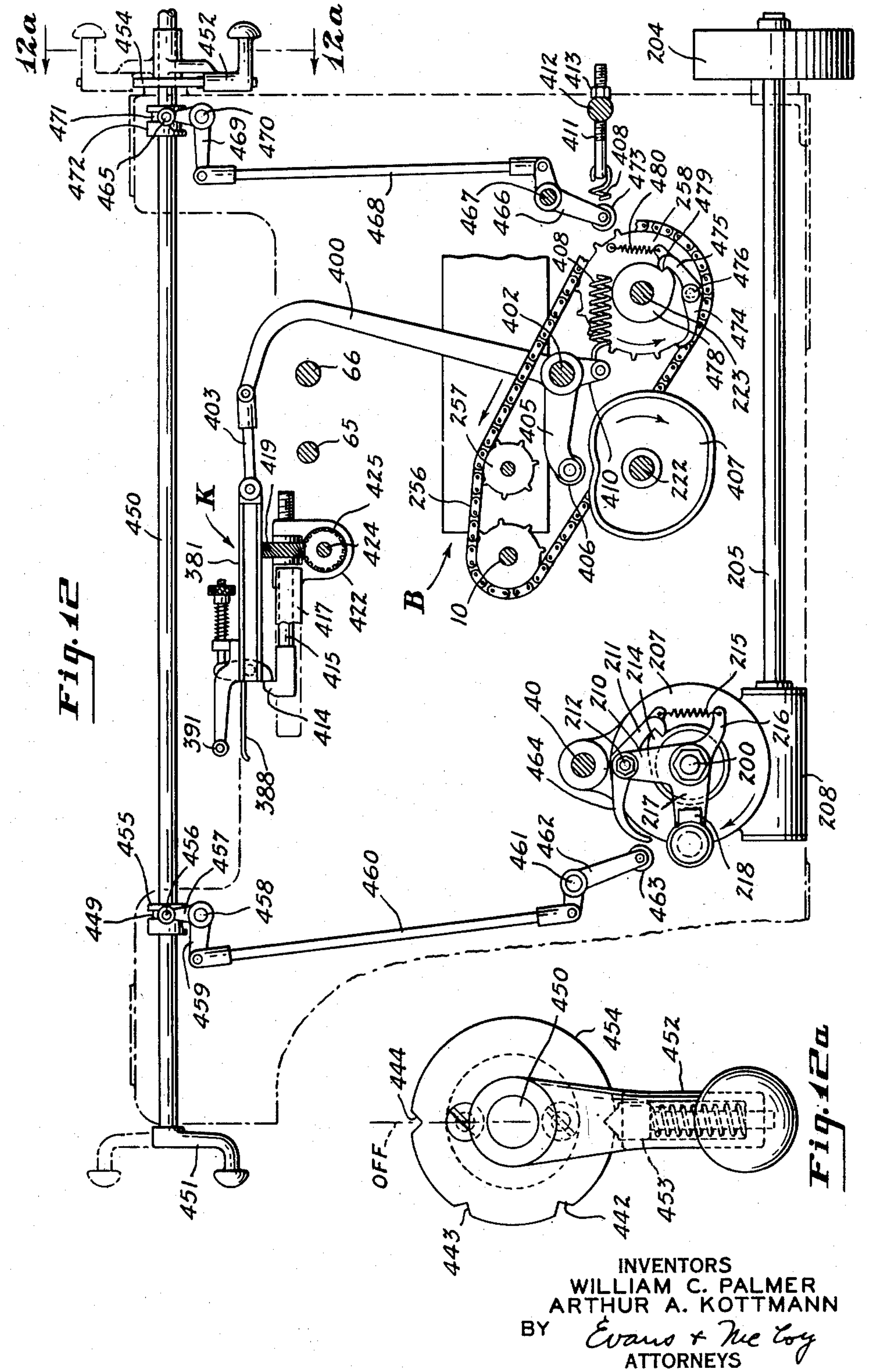
Fig. 12 is a diagrammatic elevational view from the operator's side of the machine, showing the mechanism for controlling the operation of the drive clutches and the drive for the wrapping material underlap control.
Figure 13:
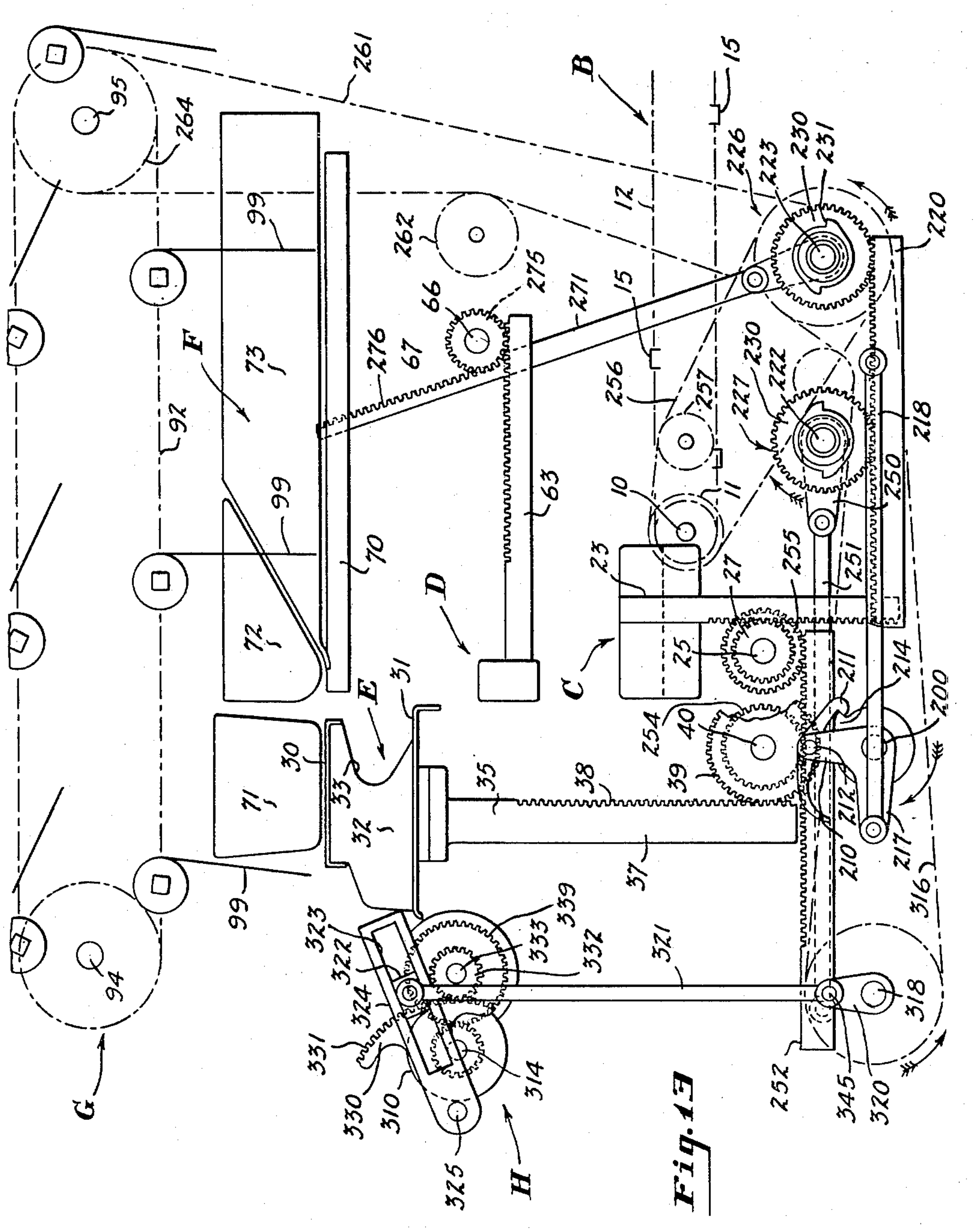
Figure 14:
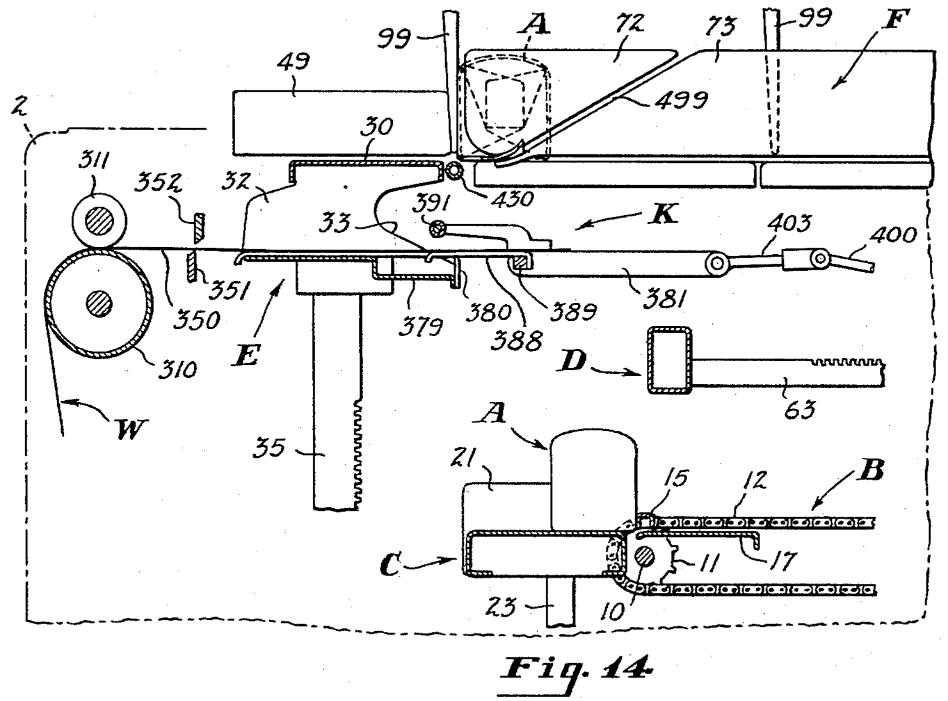

Fig. 12*a* is a fragmentary detail showing one end of the disconnect control shaft and the index plate associated therewith;

Fig. 13 is a diagrammatic elevational view from the front or operator's side of the machine, showing the relationship between the respective drives for the conveyors, carriers, article pusher and wrapping material feed; and Figs. 14 through 18 are vertical sectional views, diagrammatic in form and with parts broken away and removed, showing successive stages in the movement of an article through the machine and the relationship between the various parts of the machine during successive phases of each wrapping cycle.

An article such as a loaf of bread being processed by the wrapping machine of the present invention moves in substantially the same vertical plane from the time it is received until it is discharged, there being no transverse or side feeding conveyors involved and no lateral movement or shifting of the article other than in the one plane mentioned. Such an arrangement is of particular advantage in large bakeries where it is desired to set up "straight line" production. Coupling of the wrapping machine to a slicing machine so that articles such as bread loaves are received in sliced condition directly from the slicer and immediately wrapped and sealed is facilitated by this type of loaf travel.

*General operation*

Figure 2:
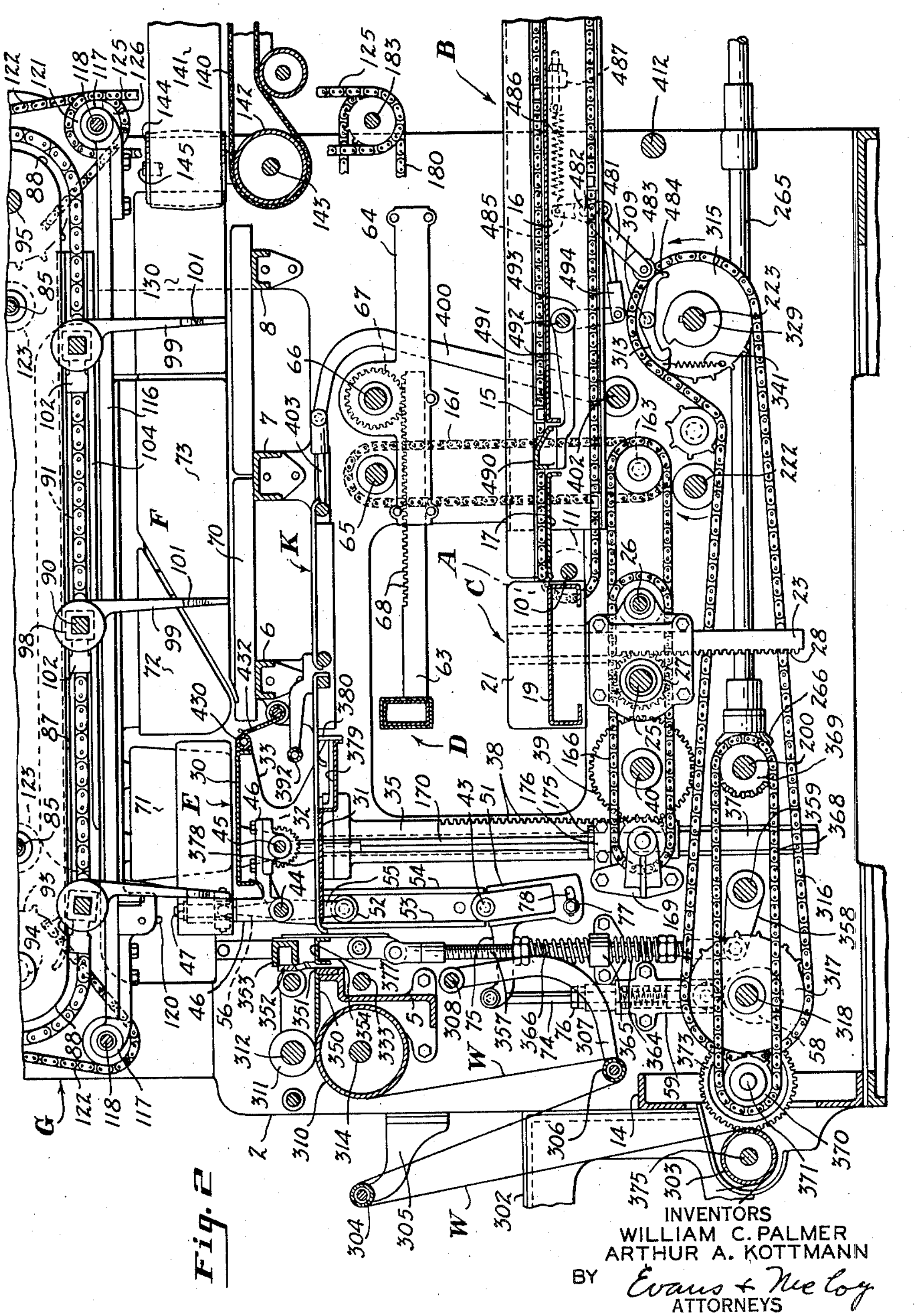
Fig. 2 is a vertical sectional view taken longitudinally through the machine with parts broken away and removed, this section being taken approximately on the line indicated at 2—2 of Fig. 4.

The relationship between the several mechanisms combined in the present machine and their interaction may be more readily understood as the description proceeds if reference is first made to certain of the illustrations such as Fig. 2 and Figs. 12 and 13, which latter show several of the mechanisms and parts in diagrammatic form. Articles A are fed into the machine by an infeed conveyor B, which may be the outfeed or discharge conveyor of a slicing machine. The articles are advanced by the infeed conveyor onto a first or bottom carrier or elevator C. The article is raised by the first carrier C to an intermediate tansfer station or level, where a pusher D moves the article onto a second or upper carrier or elevator E, the two carriers being alined at the tansfer station. The second carrier E then raises the article to the level of a wrapping and sealing channel F into and through which the article is pushed by an overhead conveyor G. Wrapping material is meanwhile advanced by feed mechanism H, received by a control carriage K and suspended so as to be engaged by and draped over an article as the latter is moved onto the upper carrier E by the pusher D. The wrapping material is folded about the article while the latter is on the upper carrier E and as the article is moved into the folding channel F.

*Frame*

The mechanisms of the wrapper are supported by a pair of upright spaced frame members 1 and 2 (Figs. 1-7), which are formed of cast metal. The frame 1, referred to as the front frame, is on the operator's side of the machine, and the frame 2 is on the rear side of the machine. These frame members are mounted on bases 3 and 4 (Fig. 4) and are connected by a number of cross members 5, 6, 7, 8 and 14, which tie the assembly into a rigid structure.

Covers or flanged casing panels 13 in the form of sheet metal stampings or welded together sheet metal pieces are disposed over the side frames 1 and 2 to enclose the racks, gears, sprockets, chains, and other moving parts of the mechanisms that would otherwise be exposed. The covers are secured to the side frames as by cap screws 29 set into apertured recesses of the covers and threaded into the side frames. Thus the operator is protected against possible injury by the moving parts of the machine and the latter are shielded from dust and other foreign material so that they can be kept thoroughly and properly lubricated.

*Infeed conveyor*

Articles are advanced into the machine over the infeed conveyor B, which is of the positive movement or flight type. The conveyor comprises a pair of spaced parallel side members 9, ends of which are disposed between the side frames 1 and 2 and the other ends of which extend to the remote or receiving end of the conveyor (not shown). The remote end may be supported by a slicing machine in accordance with well known practice. At each end of the conveyor shaft means is carried by the side members 9 to support belt or chain mounting sprockets. At the wrapping machine end the shaft means is indicated at 10 and the sprockets at 11. Endless side belts or chains 12 are trained around the conveyor sprockets for movement over spaced parallel paths. Flights 15 (Fig. 2) extend across between the side chains of the infeed conveyor and are moved thereby around an endless path so as to engage articles and advance the same into the wrapping machine. The infeed conveyor B is driven intermittently in a manner to be later described, so that the articles are advanced in step-by-step fashion (see description in connection with numerals in the 250's). An apron 16 and a discharge plate 17 are mounted between the side members of the infeed conveyor and support articles being advanced by the flights 15.

*First carrier*

Figure 4:
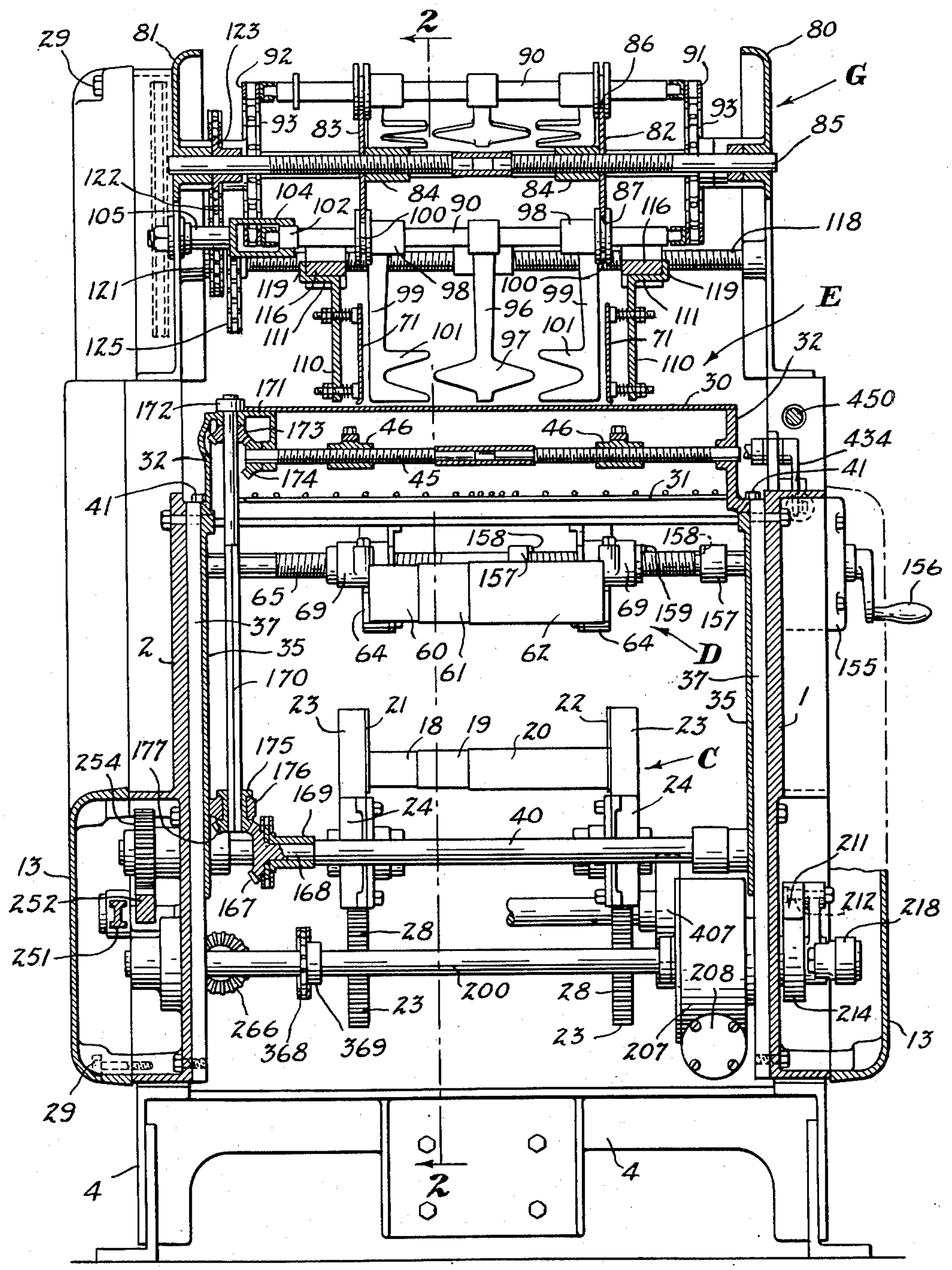
Fig. 4 is a transverse sectional view through the machine, parts being broken away and removed, this view being taken substantially on the line indicated at 4—4 of Fig. 1 and enlarged with respect to that figure.
Figure 5:
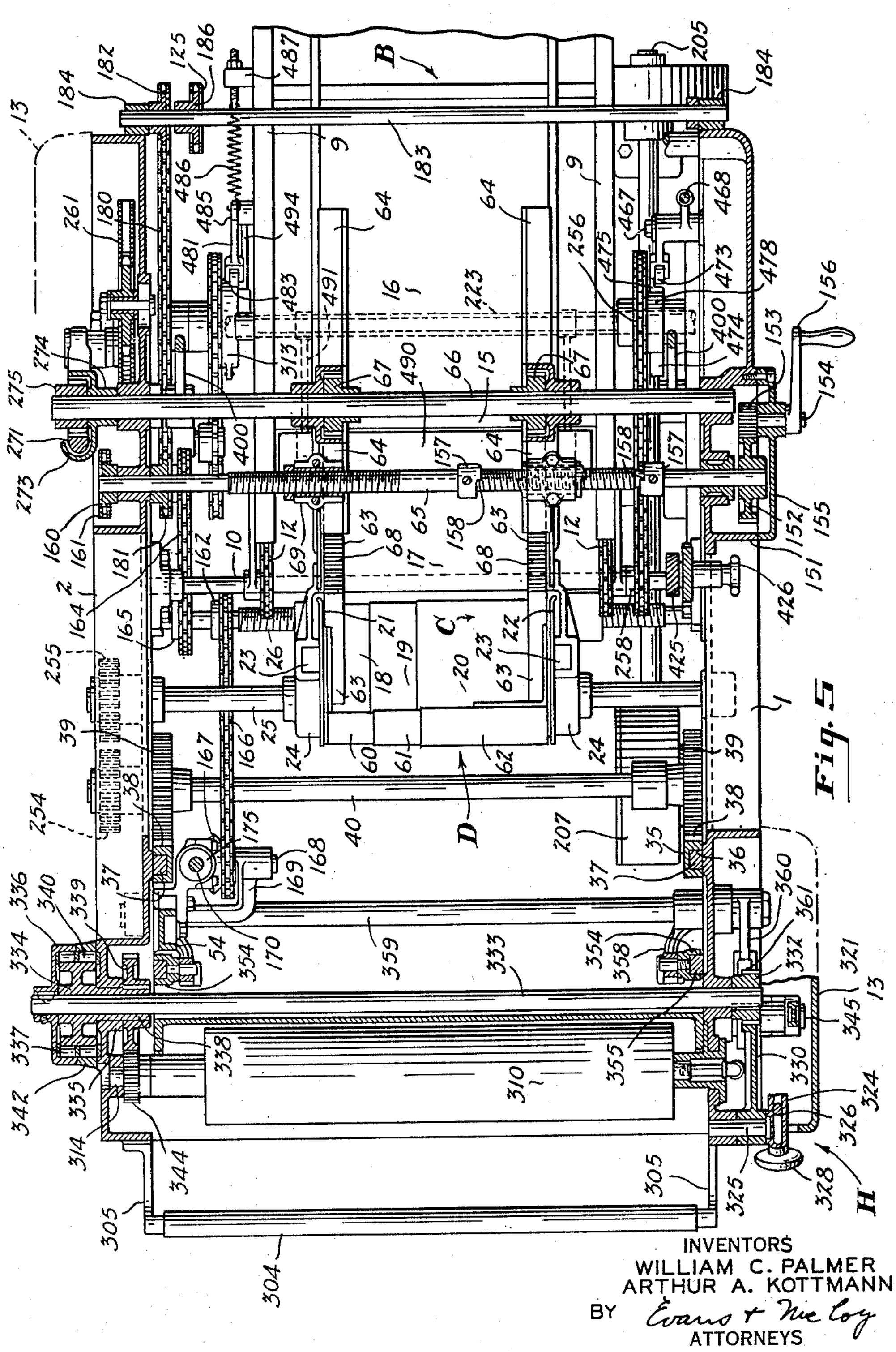
Fig. 5 is a horizontal sectional view through the machine, parts being broken away and removed, this view being taken substantially on the line indicated at 5—5 of Fig. 1.

The first carrier C is disposed so as to receive articles moved off the discharge plate 17 of the infeed conveyor. The carrier comprises box-like telescoping sections 18, 19 and 20 (Figs. 4 and 5). The section 18 is slidable within the section 19 and section 19 is slidable within the section 20, so that the effective width of the carrier may be altered, the sections collectively presenting a substantially flat article supporting surface. Plates 21 and 22 are secured in spaced relation on the outer edges of the sections 18 and 20, respectively, and extend above the article supporting surface of the carrier C to serve as upright guides for an article received on the carrier. On the outside of the guide plates 21 and 22 are secured depending parallel lift rods 23 which extend downwardly through guides 24 supported on horizontal cross shafts 25 and 26, the ends of which are carried by the frame members 1 and 2. The guides 24 are in the form of hollow housings, each made of two cast members bolted together. The cross shaft 25 has gears 27 (Fig. 2) splined thereon and disposed within the housing guides 24. These gears mesh with rack teeth 28 on the lift rods 23. Rotation of the shaft 25 and the gears 27 in a clockwise direction, as viewed in Fig. 2, lowers the carrier C, while counterclockwise rotation of the shaft and gear raises the carrier. The cross shaft 26 is disposed in spaced parallel relation to the supporting shaft 25 and has oppositely threaded ends which are received in aligned threaded apertures in the guide housings 24. Rotation of the shaft 26 in one direction or the other draws the guide housings 24 toward one another or spreads them apart, resulting in a drawing together or spreading apart of the carrier lift rods 23. These lift rods, acting on the plates 21 and 22 of the carrier, move the latter toward or away from one another, telescoping the carrier sections 18, 19 and 20, so as to reduce or increase the width of the carrier.

The first carrier C reciprocates up and down between the level of the discharge plate 17 of the infeed conveyor and a transfer station level which is part way to the level of the folding and sealing channel F. As will later appear, the first carrier C moves about one-third of the distance of height between the infeed conveyor level and the folding and sealing channel level, each article being elevated over the remaining distance by the second carrier E.

*Second carrier*

The second carrier is of double deck construction and comprises a horizontal article supporting platform 30 and a wrapping material support 31 therebelow. The sides of the article supporting and wrapping material supporting platforms 30 and 31 are connected by spaced parallel end members 32 (Fig. 6) which are recessed along their forward edges as indicated at 33 (Fig. 2) to accommodate the wrapping material gripper bar, as will later appear. The wrapping material support 31 of the second carrier E is secured at its ends to the underside of each of the end plates 32. Spaced parallel lift bars 35 of channel shape depend below the carrier to support and actuate the same. The upper ends of the bars 35 are of T-shape and are secured by bolts 41 (Fig. 6) to ears 42 extending laterally and outwardly from the lower edges of the side plates 32.

The lift bars 35 are disposed against the inside of the side frames 1 and 2 and longitudinal grooves or rabbets 36 therein slidingly receive and ride on guides 37 secured to the machine frames. Rack teeth 38 are formed along the front edges of the lift bars and mesh with the teeth of gears 39 secured on cross shaft 40 journalled at its outer ends in the machine frames. Rotation of the shaft 40 and the gears 39 in a counterclockwise direction, as viewed in Fig. 1, draws the carrier lift bars 35 downwardly in unison, thereby lowering the second carrier E. Rotation in clockwise direction raises the lift bars to elevate the carrier.

The side plates or members 32 of the carrier E support rotatable cross shafts 44 and 45 (Figs. 2 and 6) which are disposed in spaced parallel relation intermediate the platforms 30 and 31. Mounted on these shafts for movement toward and away from one another and slidable along the shaft 44 are cast metal support members 46. The shaft 45 has oppositely threaded ends threaded through the members 46 so that the latter are moved together in unison upon rotation of the shaft 45 in one direction and are spread apart by movement of the threaded shaft in the reverse direction. Above the shaft 44 the support members 46 are fitted with upright posts 47 on which are received oscillatable holders 48 and end folding arms 49. The end folding arms, supported cantilever fashion over the upper or article receiving platform 30 of the carrier, tapered dovetail fits in the holders 48, as indicated at 50, so that the end folders may be readily removed for replacement as when it is desired to change their form or size in accordance with the requirements of the particular type of article being wrapped.

Figure 6:
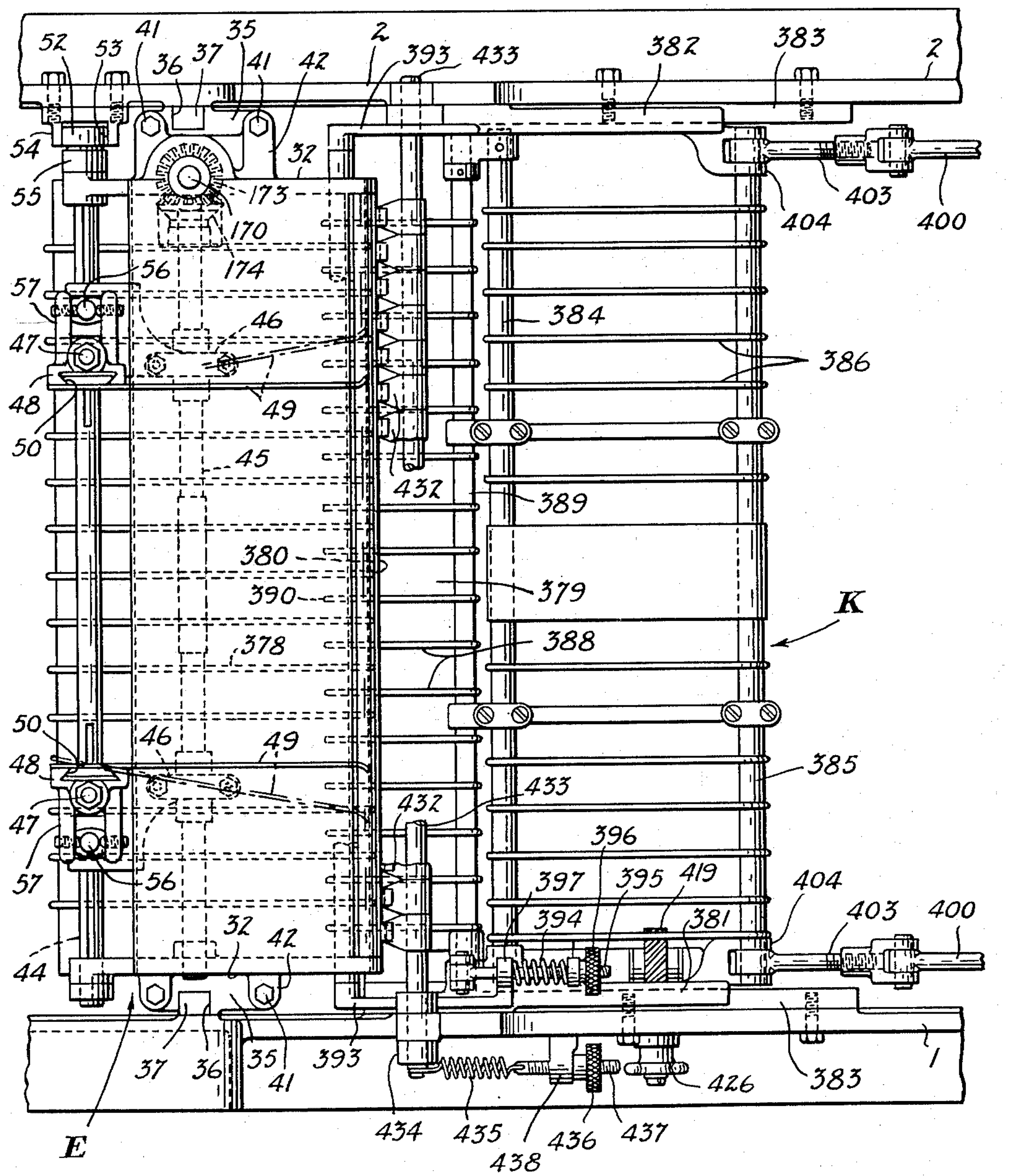
Fig. 6 is a fragmentary plan view showing the upper or second carrier and the wrapping material support.

The oscillating movement of the holders 48 on the posts 47 provides for swinging movement of the end folders 49 between an open or article receiving position, indicated by the broken lines of Fig. 6 and a closed or article holding position indicated by the full lines of that figure. Movement of the end folders between article receiving and article holding positions is effected through the action of a roller or follower 52 (Fig. 2) which rides in grooves 53 formed in a fixed roller guide 54 (Fig. 6) bolted to the inside of the side frame 2 and a swingable roller track 51. The follower 52 is mounted on the lower end of an arm 55, secured on one end of the cross shaft 44 which carries the support castings 46. Collars having upstanding arms 56 are mounted slidably on the shaft 44 within recesses formed in the support members 46 for movement with the latter along the shaft. The collars are keyed on the shaft 44 so as to be rocked or oscillated thereby when the shaft is turned under the influence of the follower 52 in the grooves 53. The upper ends of the arms 56 are in the form of spheres received between socketed ends of aligned adjusting screws carried in spaced lateral extensions 57 of the end folder holders 48. The extensions 57 are directed outwardly or away from the respective end folders and straddle the arms 56, so that the holders 48 are oscillated in unison by the simultaneous movement of the upstanding arms 56.

The swingable roller track 51 (Fig. 2) is of channel shape and depends from the lower end of the roller guide 54. A recessed cap screw 43 pivotally connects the upper end of the swingable track 51 to the bottom of the guide 54 so that the roller receiving grooves 53 of the members are in end to end relation and are continuous for all positions of the swingable track portion. The channel surfaces of the guide and track are aligned, thereby permitting the roller or follower 52 to ride longitudinally in the guide channel and into and out of the swingable track portion 51.

Lateral movement is imparted to the track portion 51 by an eccentric 58 (Fig. 2) secured on and rotatable with the shaft 318 which operates the wrapping material feed mechanism. The eccentric 58 is disposed adjacent the side frame 2 below a hollow guide bracket 59 secured to the inside of the side frame as by cap screws. A spring pressed follower, slidable vertically within a rectangular guideway in the bracket 59, has on its lower end a roller which rides on the eccentric 58 and imparts vertical reciprocation to an upright rod 74. This rod is pivotally connected to the outer end of an arm 75 which is integral with and extends laterally from the upper end of the roller track 51. Downward movement of the rod 74 swings the channel guide 51 to the right from the position shown in Fig. 2. The limit of movement is determined by adjustable lock nuts 76 on the rod 74 which engage the upper end of the guide bracket 59 as the rod descends under the influence of gravity and a helical coil compression spring. This spring is disposed about the rod and is housed within the bracket 59 so as to act between the follower and the upper end of the bracket.

A stand off or shouldered cap screw 77 passes freely through an elongated arcuate slot 78 in the lower end of the roller track 51 and is secured in the machine side frame 2 so as to guide and limit the movement of the swingable track.

With the parts in the positions illustrated in Fig. 2 rotation of the shaft 318 through a half revolution swings the eccentric 58 downwardly, lowering the rod 74 and arm 75 so as to swing the track channel 51 to the right substantially to the broken line position shown. The amount or degree of swinging movement of the track is adjusted by the position of lock nuts 76 on the threaded portion of the rod 74. The greater the swinging movement of the track the greater is the swinging or spreading apart of the end folders 49 during the subsequent movement of the carrier E to the transfer station. This swinging or shifting of the roller track 51 occurs during the rotation of the feed rollers 310 and 311 which advances the wrapping material web W across the lower level of the carrier.

During the subsequent movement of the machine the shaft 318 is stationary and as the carrier E descends to the transfer station the roller 52 rides into the channel of the track 51, the angularity of the latter causing the arm 55 to be pivoted in a counter-clockwise direction (Fig. 2) so as to turn the carrier cross shaft 44. As the carrier moves to the transfer station, the end folders 49 are thus swung apart to the broken line positions of Fig. 6 and are divergently positioned to receive the article moved onto the carrier E from the carrier C by the pusher D during the succeding movement of the machine. Such succeeding movement occurs during the rotation of the shaft 318 through half a revolution swinging the eccentric 58 to its upper position shown and swinging the track channel 51 back to the full line position. This swinging of the track channel is due to the direct action of the eccentric 58 acting through the linkage described; the movement of the track is positive and the end folders 49 are positively moved together to complete the first end folds of the wrapping material against the article ends, the carrier E still being at the transfer station.

Subsequently, during the next movement of the machine, carrier E is raised to the discharge station, the end folders 49 being positively held against the article ends by the confinement of the roller 52 within the track channels 53. In the present machine positive control of the article and wrapper is maintained, since the movement of the article away from the transfer station is not commenced until the first end folds on the wrapping material are completed and the article is positively gripped between the end folders.

*Pusher*

The articles are shifted from the first carrier C to the second carrier E at the transfer station by the pusher D, which comprises a plurality of box-like elements 60, 61 and 62 (Fig. 4), arranged in a telescopic sliding relation, the element 60 being slidable within the element 61, and the latter being slidable within the element 62. The elements 60 and 62 are secured on the ends of a pair of spaced parallel horizontal slide bars 63

Figure 1:
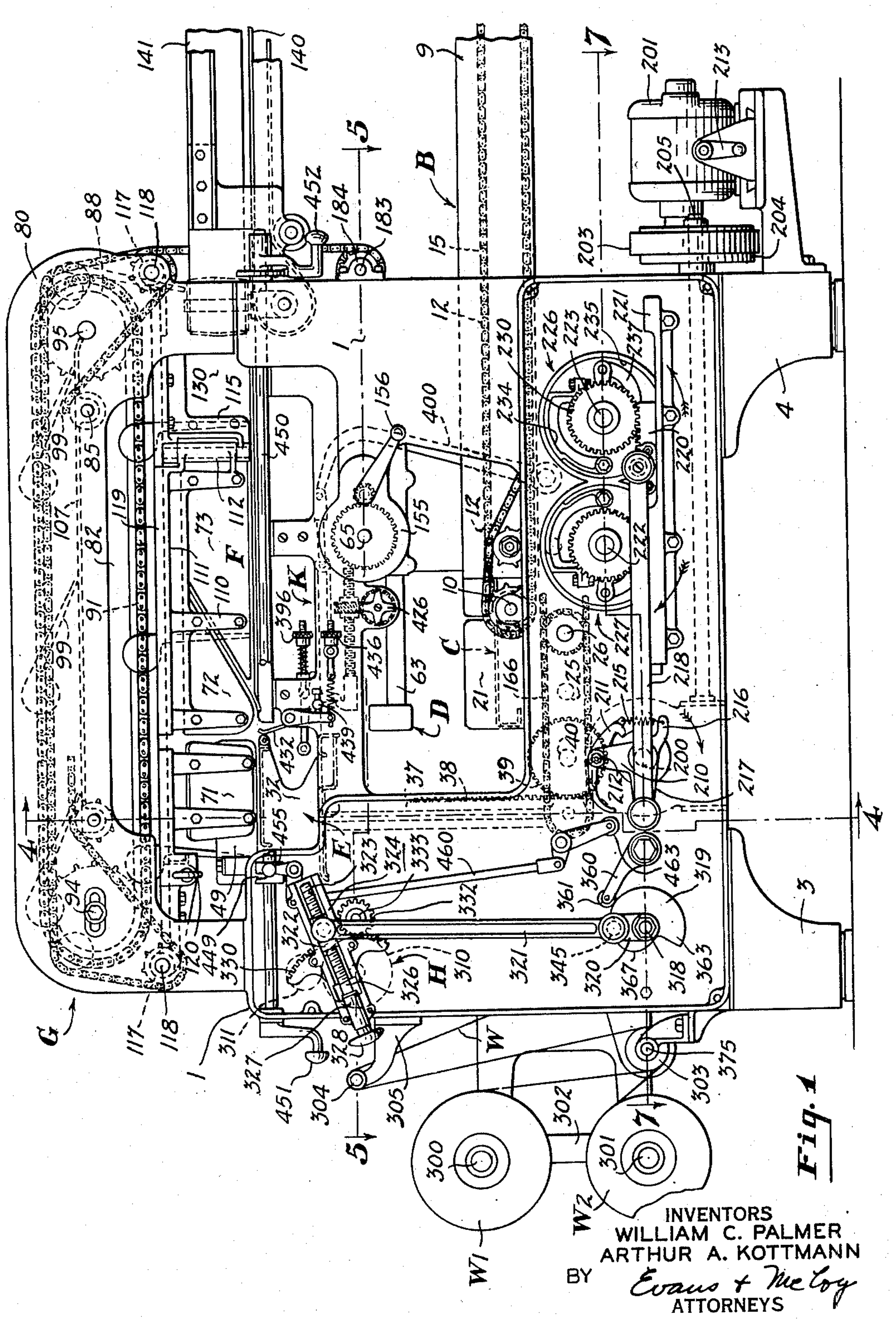
Fig. 1 is an elevational view of the front or operator's side of the wrapping machine of the present invention, parts being omitted or broken away and fragments only of the infeed and discharge conveyors being shown.

(Figs. 1, 2 and 5). The bars 63 are guided for longitudinal sliding movement in hollow guide housings 64. These guide housings are mounted on cross shafts 65 and 66, supported by the machine frames 1 and 2. The shaft 65 is formed with oppositely threaded end portions that are threaded through split sleeves 63 of the guide housings 64. By this arrangement rotation of the shaft 65 in one direction draws the guide housings 64 toward one another in unison, thereby moving the slide bars 63 and the pusher elements toward one another while maintaining their parallel relationship. Rotation of the shaft 65 in a reverse direction operates to move the guide housings 64 apart in unison to increase the spacing between the slide bars 63 and widen the pusher D. The telescoping sections 60, 61 and 62, sliding in and out of one another, accommodate the changes in width of the pusher.

Within enlarged chamber portions of the guide housings 64 are gears 67 that are splined or keyed on the shaft 66, so as to be slidable therealong and rotated thereby in all spaced positions of adjustment of the guide housings 64. The gears 67 mesh with rack teeth 68 formed on the upper sides of the slide bars 63. Rotation of the cross shaft 66 clockwise, as viewed in Fig. 2, advances the pusher D to the left for moving an article from the first carrier C onto the second carrier E. Retraction of the pusher D is effected by rotation of the shaft 66 in a counterclockwise direction, as will be later described.

*Folding and sealing channel*

The folding and sealing channel which receives articles raised to the upper level of the machine by the second carrier E comprises a generally horizontal bottom member 70 (Fig. 2) which is supported on the cross members 6, 7 and 8 of the machine frame and is heated conventionally by suitable electric elements. At the upper end of the vertical path of articles raised by the elevator E are top end folders 71, which are supported in spaced parallel relation to engage wrapping material projecting from the top of an article such as a loaf of bread over the ends of the lattter and to fold such wrapping material downwardly against the article ends. When the carrier E is at its upper limit of movement the top end folders 71 are disposed on the outside of the end folders 49 so that their lower edges lie closely adjacent the article supporting surface of the platform 30.

A pair of front end folders 72 and a pair of combined bottom end folders and sealing plates 73 form the sides of the folding and sealing channel F and may be heated in the usual manner by suitable electrical elements.

*Discharge conveyor*

Movement of articles off the second carrier E, into and through the folding and sealing channel F is effected by the discharge conveyor G. This conveyor is mounted between supplemental frame members 80 and 81 (Fig. 4) which surmount the side frames 1 and 2 respectively. A pair of elongated width controlling plates 82 and 83 are located in the space between the supplemental frame members and have threaded hubs 84 which are mounted on the oppositely threaded ends of spaced parallel rotatable shafts 85 journalled in the supplemental frames 80 and 81.

The spacing plates 82 and 83, which are disposed in spaced parallel vertical planes, have substantially straight top and bottom edges 86 and 87, and semi-circular end edges 88. These edges of the guide plates are free and unobstructed and serve as tracks for guiding the individual pushers or flights of the discharge conveyor. Each flight comprises a cross bar or rod 90, pivoted at its ends to spaced parallel side belts or chains 91 and 92, which are trained around sprockets 93 on parallel shafts 94 and 95 journalled in the supplemental frames 80 and 81. The sprocket supporting shafts 94 and 95 are parallel to the threaded shafts 85 which carry the plates 82 and 83, the threaded shafts being located between the sprocket shafts and the latter passing through the plates substantially at the centers of curvature of the plate ends. On the center of each of the flight bars 90 is secured a laterally extending pusher 96, which has a relatively broad generally diamond shaped article engaging end 97. The flight bars 90 are square or non-circular in shape (Fig. 2) and slidingly but non-rotatively receive sleeves 98 of pairs of supplemental pushers 99 one on each side of the central pusher 96. The sleeves are each formed with circumferential channels or grooves that receive the edges of the guide plates 82 and 83. As the flights are moved by the chains 91 and 92 the supplemental pushers 99 are retained in predetermined spaced relation as they move about their orbital paths by the straddling interengagement of the sleeves and the edges of the guide plates. The ends of the supplemental pushers 99 are formed with enlarged article engaging portions 101 (Fig. 4) which are directed toward one another and which are bifurcated to straddle the tapered ends of the diamond shaped article engaging portion 97 of the central pushers 96 when the side plates 82 and 83 are adjusted to narrow spacing.

On one end of each of the flight bars 90 is secured an arm 102, which lies in a plane at right angles to the pushers 96 and 99. The arms 102 are received and guided in a channel 104 (Figs. 2 and 4) which is supported cantilever fashion on stub rods 105 bolted through the supplemental side frame 81. The guide channel 104 extends along the straight portion of the lower run of the flight bars and serves as a housing for the side chain 92. The entering or left-hand end (Fig. 2) of the guide channel 104 is flared to receive the arms 102 of the flight bars as the chains move the flights onto the lower run of the conveyor travel. The flights are thus held against turning and swinging in their vertical depending position to positively push the articles off the second carrier E and into and through the folding and sealing channel F.

As the flights approach the sprockets 93 on the shaft 95 at the right-hand end of the conveyor, as viewed in Figs. 1 and 2, the flight bar arms 102 ride out of the guide channel 104, so that the flights become free swinging and are lifted by the upward movement of the side chains 91 and 92 away from the articles being advanced thereby, so as to clear the succeeding on-coming articles. During the rearward movement of the flights to the initial article engaging position at the lefthand end of the discharge conveyor (as viewed in Figs. 1 and 2), the ends 101 of the pushers 99 ride along horizontally disposed flanges 107 formed integrally on the confronting sides of the guide plates 82 and 83.

*Folder support*

The top end folders 71, the front end folders 72, and the bottom end folders 73 are mounted on depending arms 110 of swingable side gates 111

Figure 3:
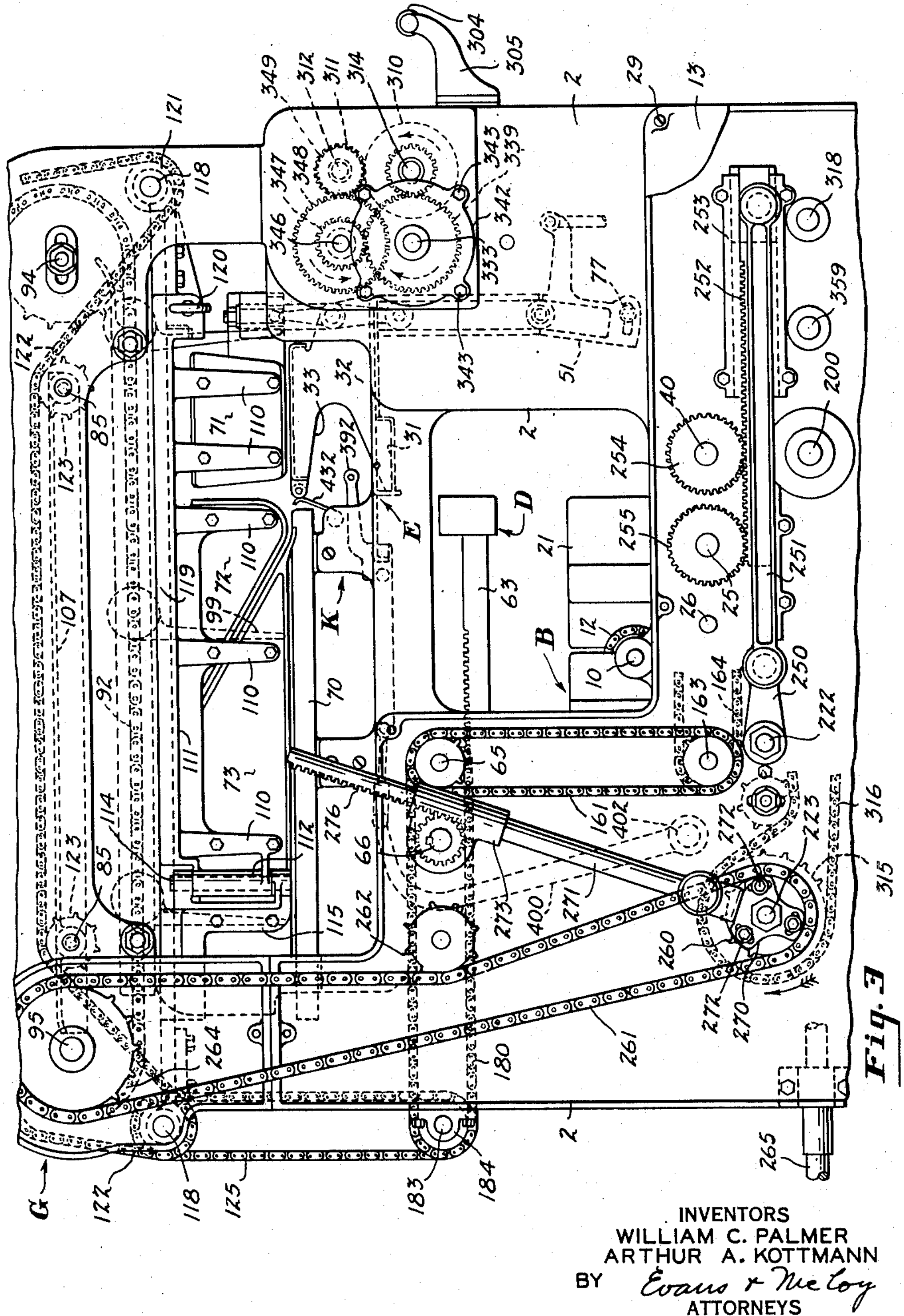
Fig. 3 is an elevational view of the rear side of the machine, parts being broken away and removed and the machine being shown in slightly larger scale than in Fig. 1.

(see Fig. 3). These gates located one on each side of the sealing channel, are of lightweight cast metal and at their ends adjacent the discharge end of the conveyor G are formed with integral tubular sleeves 112 each of which is received on a vertical spindle 114 supported in a depending bracket 115 secured to an elongated support member or bar 116. The support members 116 are disposed horizontally in spaced parallel relation to one another below the lower run of the path of the flight bars 90 (Fig. 4). At their ends the support members 116 are bolted to eye members 117 formed with internally threaded bosses received on the oppositely threaded ends of screw rods 118 journalled in the supplemental side frames 80 and 81 adjacent the ends of the latter. Rotation of the screw rods 118 simultaneously in one direction shifts the support members 116 toward one another in unison to narrow or decrease uniformly the spacing between the folders carried thereby. Simultaneous reverse rotation of the screw rods moves the support members 116 apart in unison to widen or increase uniformly the spacing between the folders.

The side gates 111 are formed to underlie the support members 116 and have upwardly directed annular flange portions 119 which lie along the sides of the members 116. Each of the gates 111 has a manually operable locking latch 120, engageable with detent means on one of the members 117 associated therewith for locking the gate in closed position. Mounting of the folders 71, 72 and 73 on the swingable gates 111, which can be quickly swung outwardly and away from the path of the articles, facilitates inspection and adjustment of the machine and permits quick access to any articles that may become misplaced or jammed in the mechanism. This feature is particularly advantageous because the folders 72 and 73, customarily heated to effect the sealing of the wrapping material, can, in the event of an emergency, be swung quickly away from the ends of articles on the bottom member 70 of the discharge channel, thereby preventing overheating or burning of the articles or the wrapping material thereon.

The screw rods 118 which extend through and support the threaded eye members 117 on the ends of the members 116 have sprockets 121 secured thereon adjacent the supplemental frame 81. These sprockets are driven in unison by an endless chain 122 (Fig. 3) which is also trained around sprockets 123 secured on the shafts 85 which mount the width control plates 82 and 83 of the discharge conveyor. The sprockets 123 are disposed under and support the lower run of the endless chain 122, elevating the latter above the level of the bottom run of the endless chains 91 and 92 that carry the flight bars. The upper run of the endless chain 122 is carried around idler sprockets which elevate the chain above the shafts 85. In this manner the screw shafts 85 for adjusting the effective width of the flight pushers 99 are operated synchronously and in unison with the screw shafts 118, having the same thread leads, for adjusting the width of the side members 71, 72 and 73 of the folding and sealing channel, the sprockets 121 and 123 being of the same size so that the respective screw shafts are operated in unison.

Actuation of the chain 122 is by means of an endless chain 125 which drives a sprocket 126 secured on one of the shafts 118 (Figs. 2, 3 and 4). The actuation of the chain 125 is described later.

Extending in the direction of article movement as continuations of the bottom end folder 73 are side guide members 130 of the folding and sealing channel. These members are supported by the depending brackets 115 which carry the pivot pins 114 and are movable toward and away from one another simultaneously with the other side members of the folding and sealing channel in adjusting the latter to articles of a different size. The side members 130 may be electrically heated to heat-seal the wrapping material or they may be refrigerated to chill overlapped and folded portions of the wrapping material.

Articles pushed through the folding and sealing channel by the pushers 96 and 99 are received on an outfeed or cooling conveyor which retains the overlapped and folded wrapping material in position about the wrapped articles for a sufficient period of time to permit "setting" of the heated seals and which also serves to conduct the articles onto a work platform for further handling. The outfeed conveyor is of conventional construction and comprises a driven endless bottom belt 140 and spaced side belts, one of which is indicated at 141. The endless belts of the outfeed cooling conveyor are trained around spaced, rotatable members or cylinders, one of the rotatable members for the bottom belt being indicated at 142 and the shaft therefor at 143. Each of the side belts is also supported on spaced rotatable members, one of the rotatable members for the side belt 141 being indicated at 144. This rotatable member is carried on a vertical spindle 145 mounted on a casting or bracket that can be laterally adjusted. A similar arrangement on the other side of the conveyor permits variation of the width between the inner runs of the side belts.

*Master control for loaf size adjustment*

Wrapping machines are customarily designed to provide for adjustment of the space between side guides, end folders and the side members of the folding channel, so that articles of different sizes can be processed. In so adjusting a wrapping machine it is desirable that all of the several mechanisms or parts that are critical or must be altered as to spacing and which customarily engage the ends of an article being processed, be simultaneously and uniformly altered in setting to correspond to the changed dimensional requirements. Machines have been proposed in which several but not all of the size changing instrumentalities are coupled together so as to be actuated in unison, thereby reducing the number of separate operations that have to be performed in adjusting the machine to process articles of different sizes. However, should any one of the several adjustments required in a conventional machine to change its setting to accommodate articles of different size be omitted, subsequent operation would be apt to cause a succession of misruns or "cripples" among the articles being processed.

In the present machine adjustment of all of the various mechanisms and parts to different size settings has been consolidated into a single master adjustment control which governs or monitors the adjustment of all of the parts or mechanisms that need to be altered when the machine is adjusted to change the size setting.

All adjustments for article size stem from and are governed by a rotatable master size control shaft, which is the shaft 65 previously mentioned in connection with the pusher D. This shaft is horizontally disposed and journalled in the side frames 1 and 2 of the machine. On the operator's side of the machine integral extensions of the frame 1 form a box or housing 151 (Fig. 5) about the journal for the shaft 65. A gear 152 secured on the shaft 65 within the housing 151 meshes with a smaller gear 153 secured on a stub shaft 154 journalled in an enlarged boss carried by cover 155 of the housing 151. The stub shaft 154 may be rotated by a crank 156 to effect the adjustment desired. The operator thus is able to turn the shaft 65 by means of the hand crank 156 at considerable mechanical advantage.

The master size control shaft, as previously mentioned, has oppositely threaded ends which are recived in threaded openings formed in the split sleeve portions 69 of the slide bar housings 64. Thus, rotation of the master shaft 65 results in altering the effective width of the pusher D so that the same can be received between the side plates 21 on the carrier C in moving an article from one carrier to the other at the transfer station. The limits of movement of the telescoping pusher elements 60, 61 and 62 are determined by shoulders 158 formed on stop collars 157 secured on the master shaft 65 at opposite ends of one of the threaded portions. These stop shoulders are engageable with mating shoulders 159 formed on one of the split sleeves 69 to arrest rotation of the shaft through the sleeve at the desired limits of movement of the sleeve along the threaded portion of the shaft.

On the outside of the side frame 2 a sprocket 160 is secured on the end of the master adjustment shaft 65 and actuates an endless chain 161 (Fig. 3) which has vertical runs and is trained around and drives a sprocket secured on a shaft 163 journalled in the rear side frame 2 of the machine below the level of the infeed conveyor B. Another sprocket on the shaft 163 has an endless chain belt 164 (Figs. 2 and 5) trained therearound, this chain actuating a sprocket 165 secured on cross shaft 26, previously mentioned in connection with the size adjustment of the first carrier C. Thus the adjusting shaft 26 which controls the width of the first carrier C is rotated in unison with the master adjustment control shaft 65 by the endless chain belts and sprockets interconnecting the two shafts.

An endless chain belt 166 (Fig. 2) is trained around a sprocket 162 secured on the cross shaft 26 to be rotated thereby and also about a sprocket on a gear 167 which is rotatably mounted on a stub shaft 168 carried by bracket 169 secured to the inside of the side frame 2. A vertical bar 170 is journalled at its upper end in a horizontal portion 171 (Fig. 4) of one of the side plates 32, previously mentioned in connection with the second carrier E. A collar 172 and a bevel gear 173 secured on the shaft on opposite sides of the journal in the horizontal portion 171 of the side plate restrain the rod against axial movement in the journal. The gear 173 meshes with bevel gear 174 secured on one end of the threaded adjusting shaft 45 previously mentioned in connection with the second carrier E. The lower end of the rod 170 is non-circular or square in section and has a sliding fit in a mating sleeve 175, rotatably mounted in split collar 176 of the bracket 169. The rod 170, while freely slidable up and down in the sleeve 175 as the carrier E moves up and down, rotates therewith by reason of the non-circular or square cross section of the parts. On the lower end of the sleeve 175 is a bevel gear 177 which meshes with and is driven by the bevel gear 167. Thus the rotation of the master control adjusting shaft 65 is imparted through chains 161, 164 and 165 and the sprockets and shafts carrying the same to the vertical rod 170 which actuates the threaded adjusting shaft 45 in the second or upper carrier E synchronously and in unison with the master control adjusting shaft.

Also actuated by the master control adjustment shaft 65 is an endless chain belt 180 (Figs. 3 and 5) which is trained around a sprocket 181 secured on the threaded master control shaft 65 inside the side frame 2 and a sprocket 182 secured on a shaft 183 supported in journals 184 on the ends of the machine side frames 1 and 2 (Fig. 5). Also secured on the shaft 183 is a sprocket 186 around which is trained the endless chain belt 125 previously mentioned and which actuates the threaded adjusting shaft 118 at the righthand end of the machine as viewed from the operator's side, see Fig. 2. Thus through the endless chain belts 180 and 125 and the sprockets and shafts supporting the same, the adjusting shafts 85 and 118 of the discharge conveyor G are actuated synchronously and in unison with the master control adjusting shaft 65, so that the pushers of the discharge conveyor and the side members of the folding and sealing channel are simultaneously and synchronously adjusted in uniform relation to one another and to the adjustment of the pusher D and the carriers C and E.

*Drive mechanism*

In the present wrapping machine there are instrumentalities (the infeed conveyor B, the pusher D and the discharge conveyor G) which operate to advance or move articles being processed over generally horizontal paths. Other instrumentalities (the first carrier C and the second carrier E) operate to advance the articles over generally vertical paths. The step by step progression of articles through the present machine is obtained by an intermittently acting drive for the instrumentalities which act in concert to forward or advance the articles. Synchronization of the various instrumentalities is essential and is obtained by the use of a common or single main drive shaft 200 journalled in bosses formed in the frames 1 and 2 and driven by an electric motor 201 (Fig. 1). The motor shaft has a spring controlled split pulley 202 keyed thereon, this pulley driving a belt 203 trained around a pulley 204 secured on a shaft 205 supported at one end in a journal 206 mounted on the base 4. The motor is slidable on V ways under the control of a threaded rod and cross-head arrangement actuated by a hand crank 213. A variable speed drive is thus provided. The shaft 205 extends longitudinally through the machine adjacent the frame 1 and at its other end is journalled in a depending portion 208 of a housing 207 which surrounds a portion of the main shaft 200. A worm secured on the shaft 205 within the housing portion 208 meshes with and drives a worm gear 209 secured on a sleeve 219 which is free running on the main shaft 200 and which is fitted with ball bearings journaling the sleeve within the housing. Lubricant is maintained in the housing 207.

The main shaft 200 extends through the sleeve 219 and the frame 1 on the operator's side of the machine and has a three-armed crank secured thereon. A pawl 211 is pivotally mounted at 212 on the end of radial arm 210 of the crank. This pawl is engageable with a radial shoulder on a dog 214 secured on the sleeve 219 to be constantly rotated thereby and disposed alongside the three-armed crank. When the crank pawl 211 and the dog 214 are engaged, a driving connection is established between the worm gear 209 and the sleeve 19 on the one hand and the shaft 200 and the crank on the other hand, which rotates the latter in a clockwise direction as viewed in Figs. 1, 2, 11 and 12. A tension spring 215 is connected between the pawl 211 and a second radial arm 216 of the crank normally to retain the pawl in driving engagement with the dog. As the shaft 200 drives all mechanisms of the machine including the conveyors and paper feed, it is only necessary to release the pawl 211 from the dog 214 to stop the machine. This feature or disconnect control is described later in connection with numerals in the 450's and 460's.

A third or driving arm 217 of the crank mounts one end of a connecting rod 218. This rod is pivotally connected at its other end to a rack bar 220 slidably mounted in a guide 221 secured on the machine side frame 1. The main shaft 200 is rotated through two revolutions for each article wrapping cycle of the machine. The shaft thus imparts a reciprocating motion to the rack bar 220, causing the latter to make four movements or two complete reciprocations during each wrapping cycle. As the crank arm 217 passes across dead center at each half revolution, the rack bar 220 experiences a momentary dwell at one end or limit of each movement thereof. This dwell feature of the drive provides a slowing down and acceleration of the article utilized in effecting the step by step movement of the articles from one instrumentality to another without abrupt or jerky stops and starts.

A pair of shafts 222 and 223 extend between the machine frames in parallel relation to one another. The shafts are supported by journals 224 (Fig. 7) carried by the frame 2 and by drum journals 225 mounted in the frame 1. The shafts 222 and 223 are intermittently actuated through over-running drives by the rack bar 220, the arrangement being such as viewed in Figs. 1, 2, 3, 7 and 11, that the shaft 222 is moved through approximately half a revolution during each movement of the rack bar to the left, while the shaft 223 is moved through approximately half a revolution during each movement of the rack bar to the right.

Figures 8, 9:
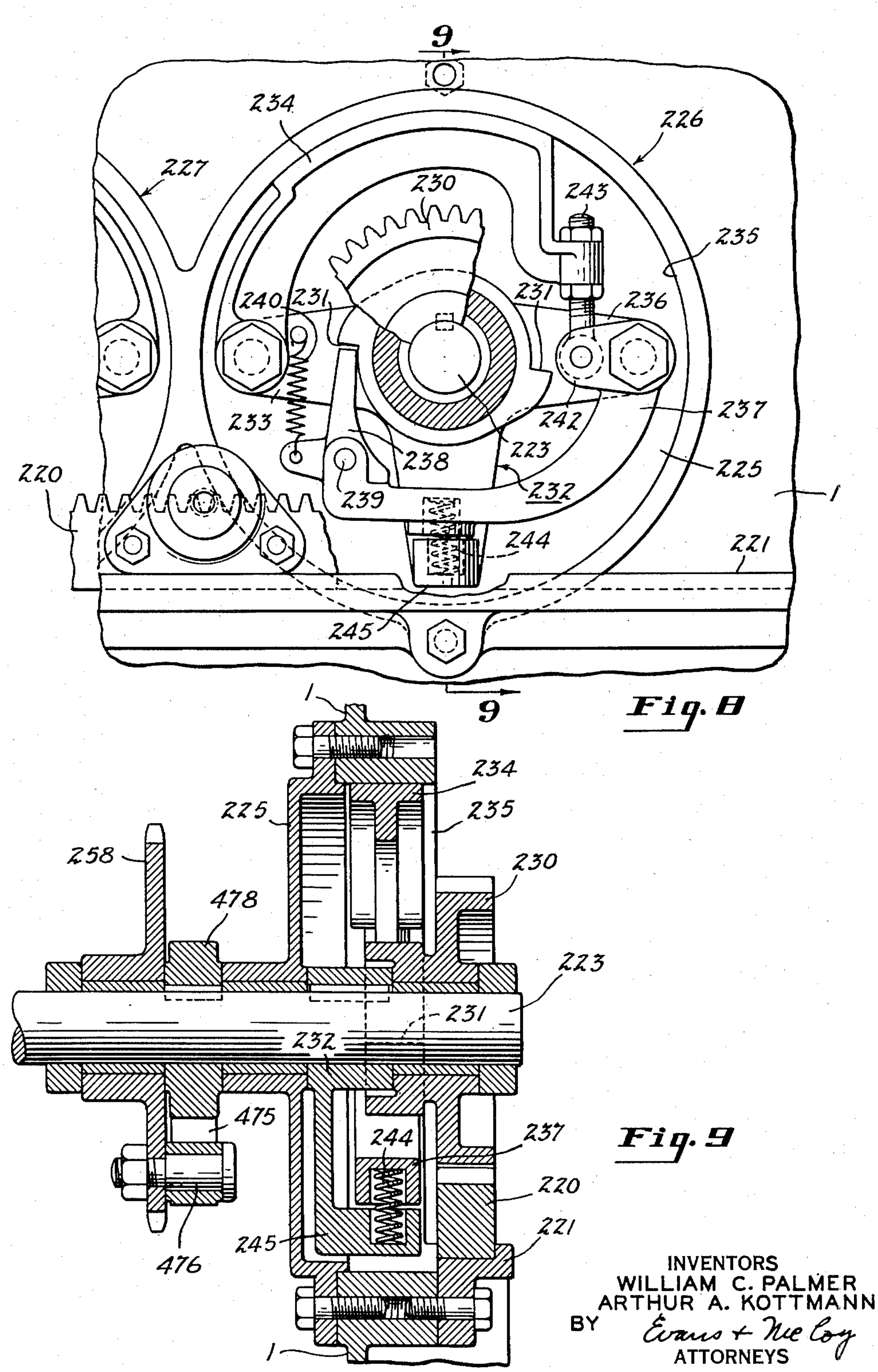
Fig. 8 is an enlarged elevational detail, partly in section and with parts broken away and removed, showing one of the overrunning or intermittent drives for the article advancing mechanisms.
Fig. 9 is a sectional detail taken substantially on the line 9—9 of Fig. 8.

The construction of the intermittent drives employed in the machine of the present invention is shown in Figs. 8 and 9 which illustrate in detail overrunning clutch 226 for the shaft 223. A similar clutch 227 not shown in detail, actuates the shaft 222. The parts of the clutch 227 are, however, reversed with respect to the corresponding parts shown for clutch 226 since the shafts are to be actuated in opposite directions.

A gear 230 is rotatably mounted on one end of the shaft 223 and meshes with the reciprocating rack 220 so that the gear is rotated first in one direction and then the other. The hub of the gear is formed with radial shoulders 231 which are diametrically opposite one another, being disposed approximately 180 degrees apart. Adjacent the gear 230 a spider 232 is keyed on the shaft 223 in driving relation thereto.

Arm 233 of the spider has one end of brake shoe 234 pivotally mounted thereon. This brake shoe frictionally engages an inwardly directed cylindrical face of a drum 235 integral with the side frame 1 and to which the drum journal 225 is bolted. Another arm 236 of the spider pivotally mounts on its outer end a bell-crank lever having a long curved arm 237 carrying a dog 238 engageable alternately with the two radial shoulders 231 of the gear hub to establish driving connections between the gear and the spider.

The dog is pivoted at 239 on one end of the bell-crank lever arm 237 and has a lateral extension to which is secured a helical coil tension spring 240 extending to the spider arm 233. The spring acts to urge the dog 238 against the gear hub so that the dog positively drops behind one of the shoulders 231 after each half revolution of the gear 230 in a clockwise direction (as viewed in Fig. 8 and other corresponding illustrations).

The other arm 242 of the bell-crank lever pivotally mounts an adjustable link 243 which is secured in the other end of the brake shot 234. Helical coil compression spring 244 acting between the bell-crank arm 237 and third arm 245 of the spider normally urges the bell-crank in a clockwise direction (Fig. 8) to hold the brake shoe 234 in frictional engagement with the brake drum 235. By this arrangement the spider and the shaft 223 are normally restrained against rotation during the dwell periods when they are not being rotated by the gear 230. During each of the half revolution driving movements of the gear 230 (counterclockwise as viewed in Fig. 8) the pressure of one of the radial shoulders 231 on the dog 238 pivots the bell-crank lever in a counterclockwise direction against the force of the spring 244, withdrawing the brake shoe 234 from frictional engagement with the drum 235 so that the shaft 223 is also rotated counterclockwise one half revolution. The spider arm 245 has an axial extension at its end which forms a housing for the compression spring 244 and which also constitutes a seat for the arm 237 of the bell-crank lever limiting the pivotal movement of such lever under the pressure of the dog 238 during each driving engagement between the dog and one of the radial shoulders 231 of the gear.

The intermittent shaft 223 actuates the infeed and overhead conveyors B and G, and the pusher D as will later be described.

*Carrier drive*

Figure 7:
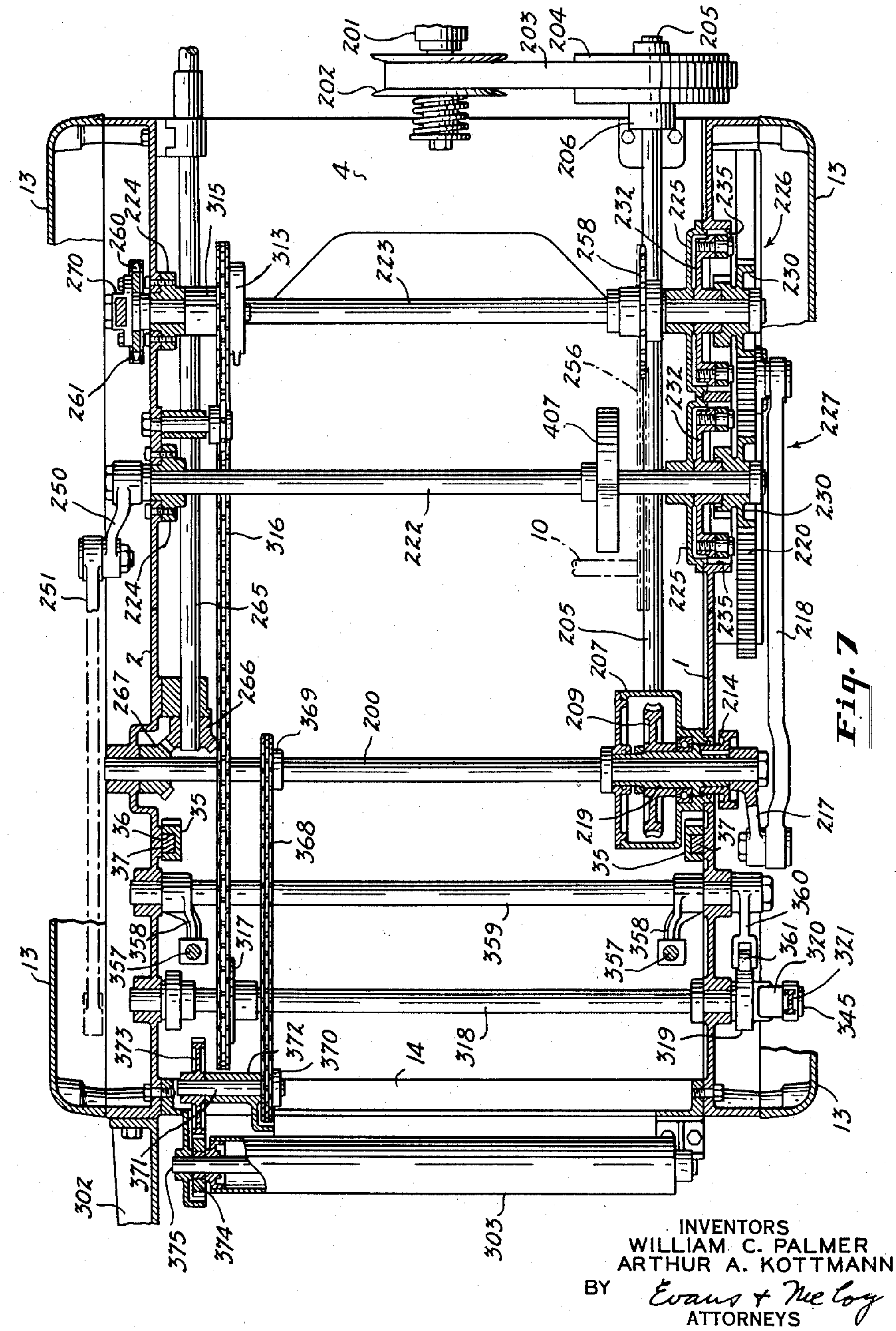
Fig. 7 is a horizontal sectional view through the lower part of the machine, parts being broken away and removed, this view being taken substantially on the line indicated at 7—7 of Fig. 1.

The shaft 222, intermittently actuated by the overrunning drive or clutch 227, which is constructed similarly to the clutch 226, is actuated in half revolution steps in a clockwise direction as viewed in Figs. 1, 2, 7 and 11, and in turn actuates the elevators or carriers C and E. A crank arm 250, Figs. 3 and 7 is secured on the opposite end of the shaft 222 from the overrunning drive clutch 227 and is disposed on the outside of the frame member 2. A rod 251 connects the crank to a reciprocable rack 252 supported slidably in a horizontal guide 253 attached to the outside of the frame 2. The rack is reciprocated over a horizontal path in the guide 253 by the rod 251 which is moved back and forth by the rotation (counterclockwise as viewed in Fig. 3) of the crank arm 250.

Gears 255 and 254 secured on the carrier drive shafts 25 and 40, respectively, are maintained in continuous mesh with the reciprocating rack 252 so as to be synchronously and simultaneously rotated thereby, first in one direction and then in the reverse direction over equal angular paths.

As previously mentioned, gears 27 secured on the cross shaft 25 mesh with the rack teeth 28 on the vertical guide rods 23 which support the first carier C. Thus the reciprocating movement of the shaft 25 effected by the action or shifting of the reciprocating rack 252 operates to move the carrier C up and down.

The gears 39 (Figs. 1, 5 and 13) secured on the carrier cross shaft 40 mesh with the rack teeth 38 of the guide rods 37 which support the second carrier E. Thus the second carrier E is moved up and down by the reciprocating rack 252 in synchronously timed relation to the movement of the first carrier C.

The shaft 222, intermittently actuated by the overrunning drive clutch 227, makes half revolution movements each of which is followed by a substantially equal or like period of dwells. Accordingly, each movement of the rack 252 is followed by a dwell period during which the rack is stationary for a period of time corresponding to the preceding period of movement. The alternate movement and dwell is employed in actuating the carriers C and E so that they remain stationary during the loading, unloading or transfer of articles. Furthermore, each rack shifting movement of the crank arm 250 is initiated when the arm is at dead center and each movement thereof terminates as it approaches dead center; accordingly, the movement of the carriers is initiated relatively slowly with a progressive increase in speed during the movement of the carriers away from the center portions of their paths followed by a progressive decrease in speed as they approach the ends of their paths. As viewed in Fig. 3 the crank arm 250 and the rack 252 are in their extreme movement or throw to the right where they dwell for a period of time during the recovery of the overrunning drive clutch 227. The other limit of movement of the rack 252 occurs with the crank arm 250 displaced 180 degrees from the position shown. At such other limitative movement another period of dwell occurs during recovery of the clutch 227.

The dwell periods of the driving rack 252 occur when the carrier C is at its top and bottom limits of movement so that articles can be moved on and off the carrier while the latter is substantially motionless.

Dwell periods occur between successive movements of the carrier E at its top and bottom limits of travel so that the movement of articles on and off the same occurs while the carrier is stationary or substantially so. The carriers C and E move oppositely so that they come together at the intermittent transfer station level where they remain motionless while the pusher D transfers an article from carrier C onto the carrier E. Thereafter the carriers move apart synchronously, the first carrier C to the infeed station at the end of the infeed conveyor B and the second carrier E to the discharge station at the level of the folding and sealing channel F. At the limits of their respective movements away from one another the carriers are stopped and remain substantially motionless during the receiving of an article by the infeed or first carrier C and during the discharge of a partially wrapped article by the second carrier E.

*Conveyor drive*

The infeed conveyor B and the discharge or overhead conveyor G are actuated from the intermittently rotated shaft 223. The infeed conveyor shaft 10 is sprocket driven by an endless chain belt 256 which is carried over an idler sprocket 257 and around a sprocket 258 supported and free running on the intermittently rotating drive shaft 223. During operation of the machine a dog and pawl arrangement provides an interlocking connection between the shaft 223 and the conveyor drive sprocket 258 and is later described in connection with the disconnect control numbered in the 450's to 470's.

A sprocket 260 (Fig. 3) secured on the shaft 223 drives an endless chain belt 261 which is carried around idler 262 and a driven sprocket 264 secured on the shaft 95 of the overhead conveyor. As previously mentioned the shaft 95 with a companion shaft 94 carry sprockets 93 which support endless side belts or chains 91 and 92 between which are mounted the flight bars 90 of the overhead conveyor. In this manner the intermittent half revolution movements of the shaft 223 are imparted to the overhead conveyor which then advances step by step. Each article advancing movement of the overhead conveyor is followed by a dwell period of substantially the same duration so that the pusher D is brought to stop at each extreme limit of movement as the preceding period of movement, the dwell periods each occurring during the recovery of the intermittent overrunning drive clutch 226 which actuates the shaft 223.

The cooling conveyor, which includes bottom belts 140 and side belts such as the belt 141, is driven continuously, not being subject to the step by step motion utilized in the other conveyors and mechanisms of the machine. A horizontal shaft 265 is mounted for rotation in journals secured to the side frame 2 adjacent the bottom of the machine. This shaft terminates adjacent the main shaft 200 and a bevel gear 226 secured thereon meshes with and is turned by a bevel gear 267 secured on the main drive shaft. The shaft 265 thus driven synchronously with the main drive shaft is suitably connected to actuate the belts of the outfeed or cooling conveyor and if desired may also be arranged to drive the conveyors of another instrumentality such as a slicing machine that may be connected to the present wrapping machine for operation in tandem.

*Pusher drive*

The intermittent drive shaft 223 projects through the frame 2 and has bolted thereon a crank structure 270 which drives a pitman 271 for actuating the pusher D. The crank 270 is formed with a spider having radial arms with arcuate slots that receive bolts or cap screws 272 threaded into the conveyor drive sprocket 260, secured on the shaft 223. When the cap screws 272 are loosened, the crank 270 can be rotated relative to the shaft 223 providing slight angular adjustment of the crank arm. The pitman 271 extends upwardly from the crank and is slidably received in a guide 273 formed on a sleeve 274, carried by the shaft 66, which is one of the shafts supporting the pusher D. A pinion 275 secured on the shaft 66 meshes with rack teeth 276 formed along one edge of the pitman 271, so that the reciprocation imparted to the pitman by the crank 270 rotates the shaft 66 first in one direction and then the other. This rotation of the shaft drives the gears 67 splined thereon so as to reciprocate the slide bars 63 that carry the article engaging elements of the pusher D.

The pusher D and the infeed B and overhead G conveyors are driven intermittently and in unison with one another by the drive shaft 223. These article advancing instrumentalities all operate to advance articles of horizontal portions of the article path through the machine. The article advancing movement of each such instrumentality is initiated in a gradual acceleration and terminated by a gradual deceleration. Dwell periods occur between the article advancing periods and are of approximately equal duration to the periods in movement. The dwell periods of the conveyors and the pusher D coincide with the movement periods of the carriers C and E which move or elevate the articles over vertical portions of the article path through the machine conversely. The dwell periods of the carriers coincide with the movement periods of the pusher and the conveyors which effect the horizontal movements of the articles. Thus when the machine is in continuous operation, a succession of articles being processed advances in step by step fashion, one group of articles moving vertically while the other articles are stationary or at rest. In the next movement or step, all of the articles are moved horizontally, no vertical movement occurring. These steps are repeated during the operation of the machine, that is, the vertical article movement without horizontal article movement and then horizontal article movement without vertical article movement. This method of handling the article movement through the machine results in positive control of the articles, largely eliminating mis-runs and "cripples." By making all of the article movements in the several successive steps relatively short, the cyclical speed of the machine is relatively high without exceeding allowable linear speeds in the articles.

*Wrapping material supply and feed*

The wrapping material used in the present machine is supplied in the form of a continuous web W which is contained in one or more rolls such as indicated at W-1 and W-2, the latter may be what is known to the trade as a band, liner, or inner wrap. The rolls W-1 and W-2 are mounted for free rotation about horizontal axes on rigid cantilever shafts 300 and 301, supported by a cantilever bracket 302 bolted on the left hand end of the frame as viewed in Fig. 1. The wrapping material is drawn off the rolls W-1 and W-2 and carried under a continuously rotating booster roller 303 which provides force to draw the wrapping material off the storage rolls by frictional engagement with the wrapping material.

The booster roller 303 is driven at a relatively high rotational speed preferably equal to or higher than the peripheral speed of the feed roller 310. An endless chain belt 368 is trained around a sprocket 369 secured on the main drive shaft 200 and around a sprocket 370 (Fig. 7) secured on a short shaft 371 journaled in a bracket 372 carried by the cross member 14 of the machine. A gear 373 secured on the short shaft 371 and driven thereby meshes with a smaller gear 374 secured on shaft 375 on which the booster roll 303 is mounted. Brackets carried by the frame cross member 14 support the shaft 375 at its ends.

The web W is drawn upwardly from the booster roller 303 over a guide roller 304 supported on the ends of brackets 305 carried by the machine frame. From the guide roller 304 the web W is carried downwardly under a slack take-up roller 306 carried between the ends a pair of free swinging arms one of which is indicated at 307, Fig. 2, pivoted at 308 on the inside of the frame 2. The other arm is similarly supported on the frame 1.

The web W is carried upwardly from the slack take-up roller 306 and over an intermittently actuated horizontal feed roll 310 surmounted by a driver pressure roll 311, the web W being frictionally engaged between the two rolls. The roll 311 is carried by a shaft 312 journaled in the machine frames and the feed roll 310 is mounted on a shaft 314 which is supported in the frames.

The wrapping material feeding mechanism is actuated by the intermittent driving shaft 223 which also drives the conveyors (see description in the 250's–260's) and pushers (see description in the 270's). A sprocket 315 (Figs. 2 and 7) is free riding or rotatable on the shaft 223 just inside the frame 2 and is disposed against the shaft journal 224.

A pin 309 carried by the sprocket 315 mounts a pawl 313 which is engageable with a radial shoulder on a dog 329 secured on shaft 223. A spring 341, tensioned between the pawl 313 and a pin carried by the sprocket 315, normally holds the pawl and the dog in driving engagement so that the sprocket 315 is driven in unison with the shaft 223. This pawl and dog provide a "quick disconnect" for the wrapped feed mechanism in the form of a so-called "one-point" clutch which is used in connection with the wrapper feed control described later by numerals of reference in the 480's.

An endless chain belt 316 is trained around the sprocket 315 and drives a sprocket 317 secured on the horizontal shaft 318 journaled in the lower portions of the machine frames at the left end of the machine as viewed from the operator's side. The shaft 318 projects through the frame 1 and on the outside of the latter mounts a cam 319 (see wrapper knife description in the 350's and 360's) and a crank 320 which rotates with the shaft.

One or lower end of an upwardly extending rod 321 (Figs. 1 and 13) is connected at 345 to the crank 320, the other or upper end of the rod being connected to a cross head 322 carried in and guided by ways of an elongated or radial slot 323 formed in an arm 324 pivoted at 325 on the outside of the machine frame 1. The cross head 322 is adjusted back and forth in the slot 323 by means of a threaded rod 326 threaded through the cross head and guided in a sleeve 327 on the arm 324. A hand wheel 328 secured on the end of the threaded rod 326 is used to rotate the rod, and the rod, being held against axial movement in the sleeve 327, moves the cross head 322 to the desired position in the slot 323. Moving the cross head to the right as viewed in Figs. 1 and 11 decreases the throw of the arm 324, while moving the cross head to the left increases the throw of the arm.

A quadrant 330 is mounted on the pivot 325 and is connected to the arm 324 for oscillation with the latter. Rack teeth 331 on the periphery of the quadrant are engaged by a gear 332 secured on a horizontal shaft 333 supported by the machine frame. The end of the shaft 333 opposite the gear 332 extends through and is rotatable in a sleeve 338 (Fig. 5) of an internal member 334 of an overrunning drive disposed on the outside of the frame. On this same end of the shaft is secured for rotation therewith a circular drum-like cap 336. The sleeve 338 is journaled in frame boss 335. Between an internal face on the top 336 and external inclined or spiral faces of the member 334 are disposed a number or first group or series of spring pressed rollers 337 which provide an overrunning driving connection between the cap 336 and the internal member 334. The rollers 337 thus run in tapering slots between the members so that when the shaft 333 is rotated counterclockwise, as viewed in Figs. 1 and 2, a driving connection is established between the shaft and the internal member 334 of the clutch. The sleeve 338 on the internal member 334 extends through the journal boss 335 and has a gear 339 keyed thereon on the inside of the machine frame.

A second series of spring pressed rollers 340 is disposed about the internal member 334 of the overrunning clutch and an internal face of a stationary drum 342 secured by bolts or cap screws 343 to the outside of the machine frame 2 and in concentric relation to the shaft 333. The rollers 340 are received in tapered openings or slots between the internal cylindrical face of the drum 342 and inclined or spiral faces formed on the internal member 334 of the overrunning clutch so as to provide a brake which prevents reverse or clockwise rotation of the shaft 333 as viewed in Figs. 1 and 2. Thus the two sets of rollers 337 and 340 engage the internal member 334 so as to provide a combined clutch and brake for driving the shaft 333 intermittently in a counter-clockwise direction while reverse or clockwise rotation, as viewed in Figs. 1 and 2 is prevented.

A gear 344 smaller than the gear 339 meshes with the latter to be driven thereby and is mounted on the shaft 314 in driving relation to the feed roller 310. Each time the shaft 333 is actuated for forward or counter-clockwise rotation (Figs. 2 and 13) by downward movement of the quadrant arm 324 the feed roller 310 is rotated at higher rotational speed in a clockwise direction (Figs. 2 and 14 through 18).

Above the shaft 333 a short shaft 346 is supported by the side frame 2 and mounts a double gear comprising a small gear 347 (Fig. 3) and a large gear 348 secured together for rotation in unison. The small gear meshes with the gear 339 keyed on the clutch sleeve while the larger gear 348 meshes with a smaller gear 349 keyed on the shaft 312 which drives the pressure roller 311. The gears are proportioned to impart to the pressure roller 311 the same peripheral speed as that imparted to the feel roller 310, the pressure roller thus being driven in a counter-clockwise direction (Figs. 1 and 11), in intermittent fashion synchronously and in unison with the feed roller 310.

The wrapping material web W engaged between the feed roll and the pressure roll is advanced into the wrapping mechanism on each down stroke of the connecting rod 321 and the crank 320 which corresponds to a half revolution of the shaft 318. The shaft 318 makes one revolution for each revolution of the shaft 223 the sprockets 315 and 317 being of the same diameter so that there is one wrapping material feeding movement of the feed rolls 310 and 311 for each 2 revolutions of the main drive shaft 200 which corresponds to a single wrapping cycle of the machine.

Wrapping material advanced by the feed roll 310 moves onto a horizontal apron 350 and passes over a bed knife 351, both carried by the cross member 5. The knife 351 extends the entire width of the apron 350 and is of sufficient length to accommodate the widest wrapping material web to be used. After each wrapping material feeding movement of the feeding mechanism, a horizontal knife 352 is moved downwardly across the edge of the bed knife to sever the previously advanced or fed web of wrapping material. The knife 352 is mounted on a horizontal cross member 353 the ends of which are carried by slide elements 354. These slide elements are of channel shape and open outwardly to straddle or embrace vertical guides 355 in the form of square rods secured to the insides of the frames 1 and 2. The lower ends of the slide elements 354 are connected by adjustable length links 357 to the ends of arms 358 secured on a horizontal cross rod 359 mounted for oscillation in the side frames 1 nd 2. The rod 359 extends through a journalled boss provided in the side frame 1 and has an arm or lever 360 secured thereon and positioned so that a roller 361 mounted on the end of the arm is disposed in the path of the cam 319.

The cam 319 is secured on and rotates with the shaft 318 which, as previously described, actuates the wrapping material feeding mechanism. During web feeding action of the mechanism the shaft 318 rotates approximately half a revolution counter-clockwise from the position illustrated in Figs. 1 and 11. During this movement of the shaft the cam follower or roller 361 rides along a uniform high portion of the cam 319, holding up the links 357 and the slide elements 354 to retain the movable knife 352 in raised position, thus permitting the feeding of the wrapping material web W across the bed knife 351. After the feeding of the wrapping material and at the end of the same movement or step of the machine cycle the cam follower roller 361 rides off high point 363 of the cam 319 dropping the movable knife 352 across the bed knife 351 and instantly severing the fed wrapping material web at that point. The action of the movable knife is aided by helical coil compression springs carried on the adjustable length links 357, one spring being indicated at 364 Fig. 2. This spring acts between an apertured guide bracket 365 which embraces the link 357 and a pair of lower adjusting lock nuts threaded on the link below the bracket. Other helical compression springs one of which is indicated at 366 embrace the links 357 and are disposed between the guide brackets and upper adjusting lock nuts on the links. The springs 366 are weaker than the springs 364 and act to stabilize the action of the movable knife 362, cushioning the downward movement of the knife actuating mechanism. After severing of the wrapping material web W by the knife 352 and during the succeeding or recovery movement of the wrapper feed shaft 318, the knife is raised to the elevated position illustrated in Fig. 2 by inclined portion 367 of the cam 319 so that prior to commencement of driving movement of the feed roll 310 the cam roller 361 is on the high side of the cam and the movable knife 352 is in elevated position.

*Wrapper feed control—article hiatus condition*

The wrapping material feeding mechanism is arranged normally to deliver a measured length of wrapping material into the wrapping mechanism for each two revolutions of the main drive shaft 200 which constitutes a cycle of the machine. In the event that an article is not advanced into the machine by the infeed conveyor B for each cyclic movement of the mechanisms wrapping material fed by the rolls 310 and 311 would drop into the mechanism and would be lost or interfere with subsequent wrapping. To prevent such an occurrence and thereby avoid unused wrapping material becoming entangled in the mechanisms or interferring with the wrapping of an oncoming article, a control is provided to govern the wrapping material feeding mechanism so as to stop the feed of the wrapper web W when a "no article" condition or article hiatus occurs in the feeding of articles onto the first carrier C by the infeed conveyor B. This control (Fig. 2) governs a dog 329 and pawl 313 or so called "one-point" clutch interposed in the driving connection between the intermittently actuated drive shaft 223 and the sprocket 315 which actuates the wrapping material feed mechanism.

Adjacent the circular path of the pawl 313 a three armed member is pivotally mounted on a short rod or stub shaft 482 (Figs. 2 and 5) mounted on the rear side member 9 of the infeed conveyor B. Arm 481 of such member carries a roller 483 that is engageable with curved arm 484 of the pawl. Another or second arm or lever 485 of the pivotally mounted member is connected to a helical coil tension spring 486 which is adjustably anchored to a member 487 on the conveyor frame. Provision is made for adjusting the tension in the spring so that the arm 481 is normally held with the roller 483 in the path of the pawl arm 484. Engaged thus by the roller the pawl is moved or held out of driving engagement with the dog 329 as shown in Fig. 2 so that rotation of the shaft 223 is ineffective to actuate the sprocket 315 and no energy is supplied to the wrapping material feeding mechanism.

During normal operation of the mechanism, however, an article being advanced by the infeed conveyor B is brought to rest on or moved over a treadle 490 carried by an arm or arms 491 secured on a conveyor frame supported cross shaft 492. A lever 493 also secured on the shaft 492 is connected by an adjustable length link 494 to the other end of the lever 485 on the short rod 482. The treadle 490 is urged upwardly through the linkage described by the spring 486 so as to project through a transverse slot in the floor of the infeed conveyor between the end of the apron 16 and the transfer plate 17. Each article advanced rides up on the treadle 490 so that the latter is depressed by the weight of the article overcoming the force of the spring 486 thereby turning the rod 482 and swinging the arm 481 so that the roller 483 is withdrawn from the path of the pawl arm 484. This withdrawal of the roller occurs prior to each wrapper feed energizing movement of the intermittent drive shaft 223 so that in normal operation, with an article being advanced into the wrapping machine during each cycle by the flights 15 of the infeed conveyor, there is no disengagement of the "one point" wrapper feed control clutch and the wrapping material web W is advanced in proper timed relation to the movements of the other mechanisms of the machine. After each article has moved off the treadle 490 the latter is raised by the spring 486, a suitable stop being provided to limit the upward movement of the treadle, and unless an article is brought up by the next succeeding flight the treadle 490 will remain in raised position, the roller 483 moving into the path of the pawl arm 484 so as to disconnect the wrapper feed drive and prevent energization of the wrapper feed during the following loaf wrapping cycle.

The several wrapping paper feeding and article advancing mechanisms of the present machine are all driven intermittently from the one main drive crank carried by the shaft 200. The rotary movement of the crank (two revolutions per loaf wrapping cycle) is converted by the one-way clutches or overrunning drives 226 and 227 into alternating intermittent movements. The intermittent movements, however, are not all of the same character: the infeed conveyor B, the overhead or discharge conveyor G and the wrapper feeding mechanism H, are all actuated intermittently in a single direction or sense whereas the first and second article carriers or lifts C and E, the article transferring ram or pusher B, the wrapper severing mechanism or knife 351 and the control carriage or wrapper positioning mechanism K are actuated intermittently in back and forth motions. Not all of the intermittent back and forth motions occur during the same portions of the wrapping cycle. For example, the pusher D moves forward while the carriers or lifts C and E are at the transfer station. The carriers then move apart while the pusher is held stationary; and the pusher is retracted or moved back while the carriers are stationary at the infeed and outfeed stations in line with the infeed conveyor and the folding and sealing channel.

It is a characteristic of the present invention, although not essential to the machine or process, that the movements of the articles is so regulated that all horizontal movements thereof occur simultaneously and alternate with the vertical movements, which also occur simultaneously. No horizontal movements occur during vertical movements and no vertical movements occur during horizontal movements.

*Underlap Control*

Wrapping material advanced into the wrapping mechanism by the feed roll 310 and pressure roll 311 after moving across the apron 350 travels over a gap support 377 (Fig. 2) and thence onto the lower platform or level of the second or upper carrier E. Across the lower apron or platform 31 and extending in the direction of wrapping material movement are a number of web supporting rods 378 arranged in parallel relation to one another. A portion of the platform 31 is offset downwardly as indicated at 379, this offset portion being along the right hand side of the carrier as viewed in Figs. 1 and 2, etc. The rods 378 extend above and in spaced relation to the offset portion 379 and have down turned ends 380 which are secured to the edge of the offset portion.

Figure 10:
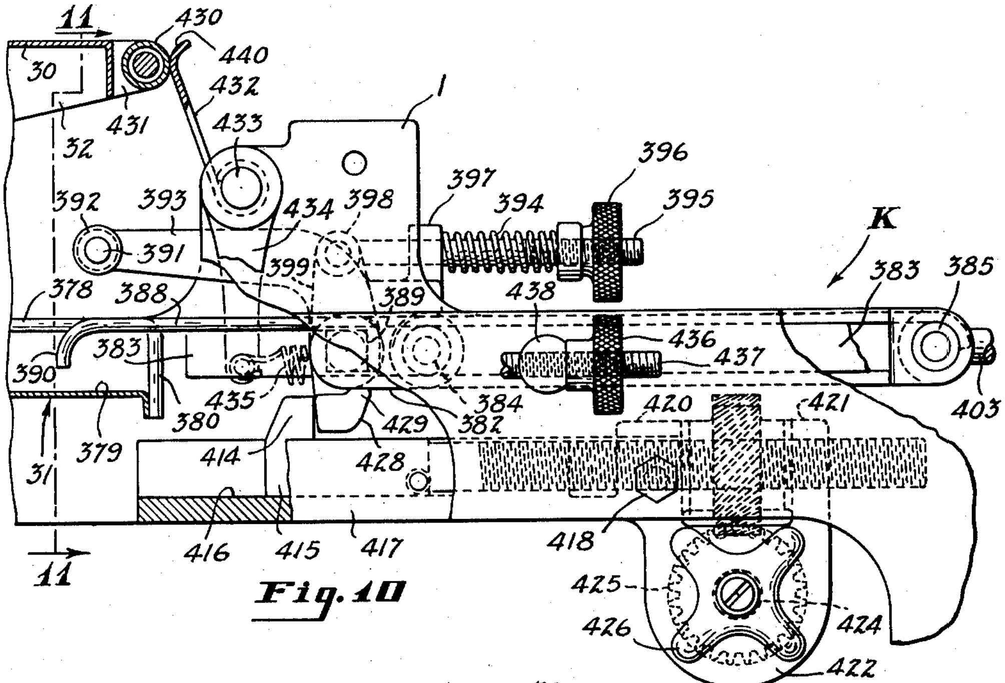
Fig. 10 is an enlarged detail view, partly in section and with parts broken away and removed, showing the mechanism for adjusting the length of the wrapping material underlap and the tightness of the wrapping material about the article.
Figure 11:
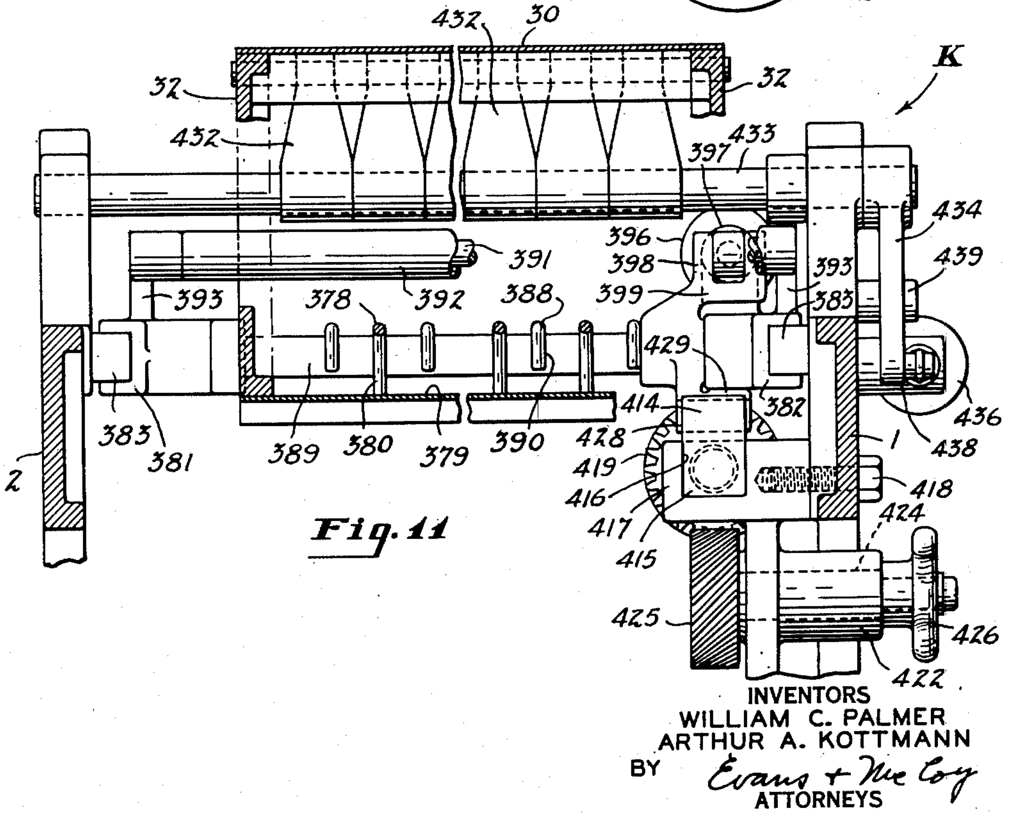
Fig. 11 is a sectional detail taken substantially on the line indicated at 11—11 of Fig. 10.

The wrapping material receiving and holding control carriage K is provided to extend as a continuation of the rods 378 of the carrier. This carriage comprises a generally rectangular frame which includes a pair of side members or slides 381 and 382 (Fig. 6) of channel form received on horizontal guide bars or ways 383 secured to the insides of the frames 1 and 2 of that machine. A pair of cross bars 384 and 385 are supported in spaced parallel relation between the slides 381 and 382 and a number of relatively narrow rods 386 span the bars 384 and 385 in parallel relation to one another and to the side members. The rods 386 are relatively closely spaced to provide support for wrapping material advanced thereonto and they extend in the direction of wrapping material movement to offer a minimum resistance to the sliding of wrapping material thereover. Between the wrapping material supporting rods 378 on the carrier E and the wrapping material supporting carriage rods 386 is disposed a tiltable gap spanning support. Such support also serves as the lower or movable part of a wrapping material clamp and comprises a transverse bar 389 to which are secured cantilever fashion a number of parallel fingers or rods 388 spaced so that their forward ends are disposed between and in interleaved relation to the rods 378 on the lower level of the carrier E. The tip ends of the rods 388 are curved downwardly as indicated at 390 (Figs. 10 and 11) so as to guide the edge of oncoming wrapping material onto the upper surface of the rods and so as to prevent tearing or piercing of the wrapping material when the latter is suspended therefrom, as will later appear. The ends of the bar 389 are received for turning movement in sockets formed in the forward ends of the slides 381 and 382 so that the fingers 388 may be tilted up and down in unison.

The upper or stationary part of the clamp comprises a transverse circular bar 391 supported between the ends of spaced parallel arms 393 formed on the slides 381 and 382 as integral forward extensions. The bar 391 has a rubber covering 392.

The fingers 388 are normally tilted upwardly and held yieldingly against the rubber covering on the cross bar 391 by a helical coil compression spring 394. This spring is received on a rod 395 onto which is threaded a knurled thumbwheel 396 which compresses the spring against upstanding ear 397 formed on the slide 381, the ear being apertured to receive the rod 395. The other end of the rod is pivotedly connected in a clevis 398 formed in the upper end of an arm 399 secured on one end of the square rod 389 which carries the clamp fingers 388. The spring 394 normally urges the lever 399 to pivot the rod 389 in a clockwise direction as viewed in Figs. 1, 2, 10, 11, 12 and the diagrammatic Figures 14 through 16. The pressure exerted against the cross bar 391 by the fingers 388 is adjustable by means of the thumb wheel 396 which can be shifted on the rod to vary the force of the spring 394.

The carriage K carrying the rods 386 and the clamp fingers 388 is reciprocated on the ways 383 by levers 400 having hubs mounted on a cross shaft 402 (Figs. 2 and 12) which is supported between the machine frames 1 and 2. The levers 400 extend upwardly from the shaft 402 and have upper ends which are curved forwardly toward the control carriage and are connected by adjustable length links 403 to the cross bar 385 at the rear of the carriage, the rear of the slides 381 and 382 being formed with bifurcated clevis portions 404 which receive eye ends of the links 403. The hub of one of the levers 400 is formed with an integral laterally extending arm 405 (Fig. 12) having a roller 406 engageable by the periphery of a cam 407 secured on the intermittent drive shaft 222. The cross shaft 402 carrying the carriage actuating levers 400 is normally urged in a counterclockwise direction as viewed in Fig. 10 by a helical tension spring 408 attached at one end to a short arm 410 extending from the arm hub having the lever 405 and at the other end to a threaded rod 411 which is passed through an aperture in a cross bar 412 supported between the side frames. The rod 411 is threaded to receive a tightening nut 413. Thus the spring 408 may be adjusted so that the levers 400 normally urge the carriage K to the left as viewed from the operators side of the machine. Retraction of the carriage or movement to the right is controlled by the cam 407 which is rotated to bear against the roller or cam follower 406 to raise the arm 405 and thereby move the levers 400 to the right.

The limit of movement of the carriage to the left as viewed from the operators side is regulated by a stop 414 which is shiftable to adjust the wrapper underlap. The stop is in the form of an integral upstanding ear on the end of elongated rod 415 supported and slidable longitudinally in upwardly opening channel 416 of a guide 417 attached to the inside of frame 1 by cap screws 418. The end of the rod 415 opposite the stop 414 is threaded to receive a helical gear 419 which is received between abutments 420 and 421 of the guide support 417. A depending boss 422 formed on the guide support 417 below the abutments 420 and 421 journals a short lateral shaft 424 which has helical gear 425 secured on one end and a hand wheel 426 secured on the other or outer end which projects through the frame 1. The gear 425 is in constant mesh with the helical gear 419 so that by turning the hand wheel 426 the gear 419 is rotated on the rod 415 drawing the latter back and forth in the guide channel 416. This movement of the rod advances and retracts the stop 414 to vary the travel of the carriage K and adjust the overlap of the wrapper.

In arresting the movement of the carriage the stop 414 engages depending arm 428 formed on the lever 399 carried by the bar 389 which supports the clamp fingers 388. Thus when the carriage is moved forward, or to the left as viewed from the operators side of the machine, by the levers 400, and the stop 414 is engaged by the depending arm 428, stopping the carriage, the impact of the arm 428 against the stop pivots the cross bar 389 counter-clockwise and swings the clamp fingers 388 downwardly substantially to the position shown in Fig. 10 in which the fingers and the bars 378 are in substantially the same article supporting plane. A laterally extending finger 429 formed as an integral extension of the arm 428 extends under the body of the slide 382 and engages the latter to limit the pivoting movement of the bar 389 and the fingers 388 thereby preventing excessive downward movement of the clamping fingers.

*A wrapper tightness control*

As the second or upper carrier E moves to the outfeed station of wrapping mechanism at the level of the folding and sealing channel the wrapping material draped over the article depends below the upper level or platform 30 of the carrier on which the article is supported. This depending wrapping material is normally pressed against a horizontal roller 430 (Fig. 10) which may be rubber covered and which is journaled at its ends in extensions 431 of the carrier side plates 32. Pressure spring fingers 432 are supported cantilever fashion adjacent the path of the carrier or lift F on a cross rod 433 journaled at its ends in bosses formed in the frames 1 and 2. The rod has a friction fit in a tubular sleeve rolled on one edge of the pressure plate and extends through frame 1 and on the outside of the latter has an arm 434 secured thereon which is normally drawn by helical tension spring 435 to rotate the cross rod 433 in a counterclockwise direction as seen from the operator's side of the machine. The tension in the spring 435 can be adjusted by means of a knurled thumb wheel 436 threaded onto a rod 437 carried through an aperture in a supporting boss 438 attached to the side frame 1. The rod 437 is connected to the spring 435 so that the spring normally holds the arm 434 against a positioning stop 439 (Fig. 11) on the machine frame.

As the carrier E moves to the outfeed station wrapping material portion 496 depends below the carrier platform 30 and extends down, past the roller 430. The pressure fingers 432 formed of spring sheet metal are normally held in the path of the article and the roller 430 by the spring 435 and as the final upward movement of the carrier occurs, the pressure fingers 432 press against the article side, smoothing the wrapping material and holding the latter yieldingly against the roller. This relative movement of the parts has a wiping action on the wrapping material, drawing the latter tightly about the article. Upturned curved portions 440 along the free edge of the pressure fingers 432 provide rounded surfaces for contact with the wrapping material and minimize the likelihood of cutting or tearing the wrapping material. The roller 430 and the pressure fingers 432 continue to grip the wrapping material portion 496 as the article is pushed off the upper level of the carrier by the depending members of one of the flight bars 90. During this movement of the article into the sealing channel, the curved edges 440 of the pressure fingers 432 smooth the wrapping material against the underside of the article and holds the overlapped wrapping material portions tightly together to reduce slippage and loosening of the wrapping material.

*Manual drive control*

In order to set in motion the mechanism of the wrapping machine and to stop them or only the infeed conveyor, as in case of emergency, there is provided a disconnect mechanism which includes a rod 450 extending longitudinally through the top of the machine on the operators side and journaled for rotation in bosses formed in the ends of the machine frame 1. Hand levers 451 and 452 are provided for turning the rod, the lever 452 carrying a spring pressed detent 453 which is receivable in recesses or notches formed in the periphery of a circular indexing plate 454 secured against the frame journal boss. A cylindrical member 455 secured on the rod 450 is formed with a circumferential cam groove 449 which receives a pin 456 in arm 457 of a bell-crank lever pivoted on a stub shaft 458 supported by the frame 1. Arm 459 of the bell-crank lever is connected by an adjustable length link 460 to the short arm of a bell-crank lever 462, pivoted on a stub shaft 461 carried by the frame. The rod 450 can be rotated by the operator to move the detent 453 from one to another of the notches of the index plate 454 (Fig. 12*a*), an "on" or full drive notch being indicated at 442, an "off" or full disconnect notch being indicated at 444, and an intermediate or infeed conveyor disconnect notch being indicated at 443. Rotative movement of the rod 450 causes the pin 456 of the bell-crank lever to follow around in the cam groove 449, operating through the linkage described to swing the bell-crank lever 462 in a counter-clockwise direction as viewed in Fig. 12, moving roller 463 into the path of curved arm 464 formed as an extension of the main drive shaft pawl 211 which establishes the driving connection between the 200 and the crank which actuates the connecting rod 218. As the pawl arm 464 is moved against the roller 463 by the rotation of the crank on the main drive shaft 200, the pawl is turned in a counter-clockwise direction and released from the dog 214, disconnecting the drive so that the mechanisms of the machine stop.

The pawl 211 is so positioned on the driving crank and the bell-crank lever 462 is so located that when the pawl is released from the dog 214, the main drive rod 218 stops at its extreme limit of movement to the left as viewed from the operator's side of the machine. When thus stopped, the carriers C and E are at their limits of movement; that is, they are either at the transfer station as in Figs. 15 and 16, or they are separated, the first carrier C being at the level of the infeed conveyor and the second carrier E being at the level of the folding and sealing channel as shown in the other figures.

When the machine is stopped by moving the disconnect rod 450 so as to swing the roller of the bell-crank lever 462 into the path of the pawl arm 464, the movements of the conveyors are arrested only in predetermined positions. The infeed conveyor B is thus stopped only when one of the flights 15 has completed the movement of an article either onto treadle 490 or onto the first carrier C. The overhead conveyor G is stopped only when one of the flights has completed either the movement of an article off the second carrier E into the folding and sealing channel F or a complete step movement along the channel. By employing this type of disconnect control the machine operation is arrested only in predetermined positions of the article wrapping cycle, namely on the complete cycle and the half cycle. The stopping of the machine with an article partly transferred onto the first carrier C or partly transferred into the folding and sealing channel F is avoided. Furthermore, the carriers C and E are not stopped at intermittent positions of their paths, but only at the extreme limits thereof so that stopping of the machine with an article partially wrapped on the carrier E or partly raised on the carrier C does not occur.

A separate drive disconnect for the infeed conveyor is provided and comprises a bell-crank lever 466 pivotally mounted on a frame supported pivot 467 and connected by an adjustable length link 468 to bell-crank lever 469 pivoted on a frame supported stub shaft 470. A pin 465 in one arm of the lever 469 rides in a circumferential cam groove 471 formed in a cylindrical cam 472 secured on the disconnect rod 450. Rotation of the disconnect rod 450 by either of the levers 451 or 452 so that the detent 453 moves into conveyor stop notch 443 and operates through the cam and linkage arrangement to swing the lever 466 so as to carry a cam roller 473 thereon into the path of a curved arm 474 of a pawl 475 pivotally carried by a pin 476 secured on the sprocket 258 previously described in connection with the conveyor drive. The sprocket 258 is rotatable or free running on the intermittent drive shaft 223 adjacent the drum journal 225 of the clutch 226 and is driven by an interlocking connection between a dog 478 secured on the shaft 223 and formed with a radial shoulder 479 which engages the pawl 475 so that the shaft and sprocket rotate in unison. A spring 480 tensioned between the pawl 475 and a pin carried by the sprocket normally urges the pawl against the dog 478 so that, as in the other pawl and dog clutches described herein, the driving engagement of the parts is maintained except when the pawl is positively pivoted away from the dog. Such disengagement of the pawl and the dog occurs when the curved arm 474 of the pawl moves into engagement with the roller 473 on the bell-crank lever 466 of the disconnect mechanism. At such a time, although the shaft 223 may continue to rotate, the sprocket 258 stops and likewise the chain 256 actuated thereby also stops to arrest the movement of the infeed conveyor B. The rotative position of the dog 478 on the intermittent drive shaft 223 is set so that the interruption of the infeed conveyor drive occurs only when one of the flights 15 has completed the movement or pushing of an article either onto the first or lower conveyor C or treadle 490. Thus interruption of the conveyor with an article only partially delivered to the carrier is avoided and damage or crippling of the article is prevented. The engagement between the drive disconnecting roller 473 and the pawl arm 474 occurs at the end of an article advancing movement of the infeed conveyor with the conveyor substantially at rest so that a minimum of force is being exerted on the pawl by the dog 478 and the disconnecting of the parts is effected with a minimum of effort and very little wear.

*Operation*

In the drawings (except the diagrammatic illustrations, Figs. 14–18) the machine is shown with the parts and mechanisms thereof in position for commencing a cycle which comprises four movements. No article is on the treadle 490 (Fig. 2) and the wrapper feed control clutch comprising the pawl 313 and the dog 329 is disconnected so that no wrapping material will be fed by the rolls 310 and 311 in the ensuing cycle.

In this starting position, however, the leading flight 15 of the infeed conveyor B is in position to advance an article that might be disposed ahead of the same onto the first or lower conveyor C at the infeed station level, the article supporting surface of the carrier being in alignment with the transfer plate 17 of the infeed conveyor. The article advancing ram or pusher D is advanced while the second or upper carrier E is in raised position at the outfeed station and level with the folding and sealing channel F. The flight or article engaging assembly carried by one of the overhead conveyor flight bars 90 is positioned so that on the next movement of the overhead conveyor any article on the upper level or platform 30 of the carrier E will be moved into the folding and sealing channel between the front end folders 72. The wrapper feed crank 320 and the feed rolls 310 and 311 energized thereby are in position to advance the leading edge of the wrapper web W across the bed knife 350 while the movable knife 352 is in raised position in readiness for a severing operation as soon as the roller 361 rides over the drop off point 363 of the cam 319. The wrapper control carriage K and the gripper mechanism mounted thereon are in advanced position in readiness to receive and grip between the roller 391 and the fingers 388 wrapping material advanced into position and to hold such wrapping material in suspended position for the engagement by the next oncoming loaf.

The functions of the various parts and mechanisms and their relation and interaction will now be described in connection with the processing or wrapping of an article, it being understood that in normal operation a succession or series of articles are wrapped continuously one after another in the same manner. The processing of each article normally commerce prior to the completion of the processing of one or more preceding articles so that a plurality of articles are normally simultaneously in process and the wrapping of an article continues over or requires more than a single cycle of the machine.

With the parts and mechanisms in the positions illustrated in Figs. 1 through 8 the electric motor 201 is energized through a suitable switch, starting the rotation of the worm gear 209 and the main driving dog 214. The disconnect control shaft 450 is moved by the operator from "off" position in which the detent 453 is engaged in the notch 444 of the index plate 454, to initial drive or conveyor disconnect position in which the detent is engaged in the notch 443 of the plate and the main drive shaft 200 is actuated by the driving engagement established between the dog 214 and the pawl 211. In this initial drive position the roller 473 on the bell-crank lever 466 engages the arm 474 of the pawl 475 to hold the latter out of engagement with the dog 478. Thus, so long as the disconnect control shaft 450 is so positioned that the detent engages the notch 443 the driving connection between the intermittent shaft 223 and the infeed conveyor B is interrupted and the infeed conveyor remains idle even though the intermittent shaft 223 may be rotated and the other mechanisms of the wrapping machine may be driven in the manner described by the main drive shaft 200.

When the operator is ready to commence the wrapping of articles, the disconnect control shaft 450 is further rotated by either the hand crank 451 or 452 so as to move to the full drive or "on" position in which the detent 435 is engaged in the notch 442. In this full drive position the disconnect control shaft 450 holds the roller 473 out of the path of the pawl arm 474 so that the pawl engages the dog 478 to "pick up" the infeed conveyor in correct timed relationship to the other mechanisms of the wrapping machine. Thereafter the conveyors of any other instrumentality such as a slicing machine arranged to feed articles onto the infeed conveyor B are set in motion so that the movement of a succession or series of articles into the wrapping machine is commenced. The slicing machine conveyors may be actuated from the shaft 265 so as to move in timed relation to the cyclic operation of the wrapping machine.

During normal operation the main drive shaft 200 makes two complete revolutions for each cycle of the machine. Four movements are thus imparted to the main drive rod 218 and the main rack bar 220.

*First movement*

During the first movement or stroke of the rack bar to the right as viewed from the operator's side, the intermittent clutch 226 rotates the shaft 223 approximately 180° or half a revolution in a counter-clockwise direction, the shaft 222 being idle during this movement and held stationary by the brake shoe 234 thereof. This movement of the intermittent drive shaft 223 moves the infeed conveyor B one step to advance the leading article A off or over the treadle 490 and onto the first or lower carrier C at the infeed station. At the end of the movement the infeed conveyor stops (Fig. 14) with the leading flight 15 at the end of the transfer plate 17 and the article A supported entirely on the sections 18, 19 and 20 of the carrier.

During the first step movement of the infeed conveyor B and in unison therewith the overhead conveyor G is moved one step to advance the preceding article into and other articles through the folding and sealing channel F as will later appear. The pusher D is retracted from its advanced position shown in Figs. 1, 2 and 13 to the initial position illustrated in Fig. 14.

The wrapper feed H is also actuated during the first movement, the leading article A on the infeed conveyor having passed over and depressed the treadle 490 to prevent disengagement of the pawl 313 from the driving dog 329. The quadrant arm 324 is actuated by the crank 320 in unison with the conveyors to drive the feed rolls 310 and 311 to feed the wrapper web W across the bed knife and under the raised knife 352. The movable knife is held in raised position by the cam 319 which holds the arm 360 in the position shown in Fig. 1, during the wrapping material feed. At the end of the first movement of the cycle, and as the wrapper feed crank 320 approaches dead center at the bottom of its throw, the roller 361 drops off the cam point 363 allowing the knife 352 to fall and sever the wrapping material web W.

The advancing web of wrapping material moves across or slides over the bars 378 on the lower level of the second carrier E and onto the wrapper control carriage K which is in horizontal alignment with the lower level of the carrier. On the control carriage the advanced wrapping material is supported by the fixed bars 386 and by the clamping or gripping fingers 388 which are interleaved with the carrier bars 378 to provide a substantially continuous support for the relatively flimsy wrapping material web, the feed end of the web thus being supported over its entire length to prevent drooping thereof.

The half revolution imparted to the shaft 318 to drive the wrapper feed during the first movement turns the eccentric 58 approximately 180° from the position shown in Fig. 2, thereby effecting swinging of the roller track portion 51 to the broken line position indicated—ready to impart spreading movement to the end folders 49.

During this first movement the carriers or lifts C and E remain stationary, the carrier C being held at the infeed station in alignment with the discharge plate 17 so as to receive the article advanced off the discharge plate and the carrier E being held at the level of the bottom member of the folding and sealing channel F. The control carriage K for the wrapping material is held in advanced position with the clamping fingers 388 withdrawn from the rubber covered clamping bar 391 so that the web W may be fed therebetween.

As the arm 217 of the main crank moves the main rack bar 220 to the extreme limit of movement to the right, the crank approaches and passes dead center and all the moving mechanisms of the machine are gradually brought to rest prior to and in readiness for the second movement of the cycle.

*Second movement*

As the rack 220 commences movement to the left starting the second step or movement of the cycle the brake shoe 234 of the intermittent clutch 226 locks the shaft 223 preventing movement of the mechanisms driven thereby. The clutch 227, however, operates to effect the driving connection between the main rack bar 220 and the intermittent drive shaft 222 so that the latter is rotated through approximately 180° or half a revolution in a clockwise direction as viewed from the operator's side. This movement of the intermittent shaft 222 acts to raise the first or lower carrier C from the infeed conveyor level to the transfer station level and to lower the second carrier E from the level of the folding and sealing channel to the transfer station level, both conveyors being moved toward one another simultaneously and in unison.

As the second carrier E starts its downward movement the cam 407 on the shaft 222 moves into engagement with the roller 406 on the arm 405 to swing the arms 400 to the right or clockwise as viewed in Figs. 1 and 12. Thus the wrapper control carriage K is shifted to the right a sufficient distance to free the arm 428 from the stop 414 and permit the spring 394 to draw the clamping fingers 388 upwardly against the clamping bar 391 gripping the web W therebetween. The shifting of the wrapper control carriage also moves the roller 391 and the clamping fingers 388 to the right so that they clear the roller 430 on the upper level of the carrier E as the carrier moves downwardly to the transfer station (see Fig. 15).

The length of the path over which the wrapper control carriage is withdrawn governs the position of the underlap of the wrapping material with respect to the bottom of the article and is determined by the position or setting of the stop 414. By turning the hand wheel 426 in one direction the stop 414 is shifted to the left as viewed from the operator's side, thereby increasing the control carriage path length and increasing the portion 496 (Fig. 17) of the wrapping material that depends below the article as the latter moves into the folding and sealing channel and is folded under the article. Conversely, movement of the stop 414 to the right shortens the path of the wrapper control carriage to decrease the portion of the wrapping material that is folded under the article as the latter moves into the folding and sealing channel.

Figure 15:
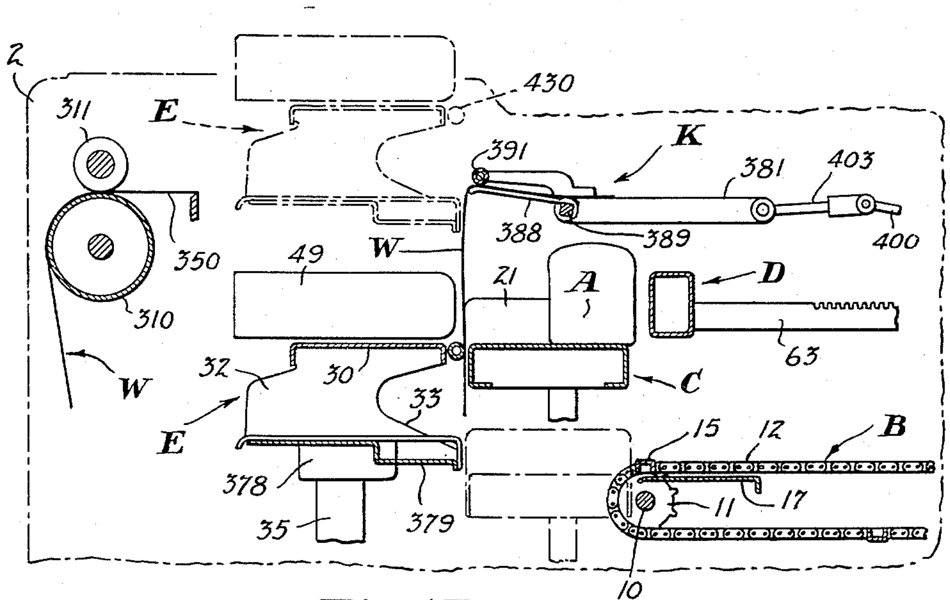

During the movement of the second carrier E down to the transfer station from the broken line position to the full line position shown in Fig. 15, the severed wrapping material web W, clamped between the bar 391 and the fingers 388, is drawn off the bars 378 on the lower level of the carrier and hangs suspended between the carriers C and E at the transfer station. Also, during the second movement, the end folders 49 are swung apart on the carrier E by the movement of the follower or roller 52 downwardly into the swingable track or guide 51 which was shifted to tilted position (indicated by the broken lines of Fig. 2) during the first movement.

*Third movement*

Figures 16, 17:
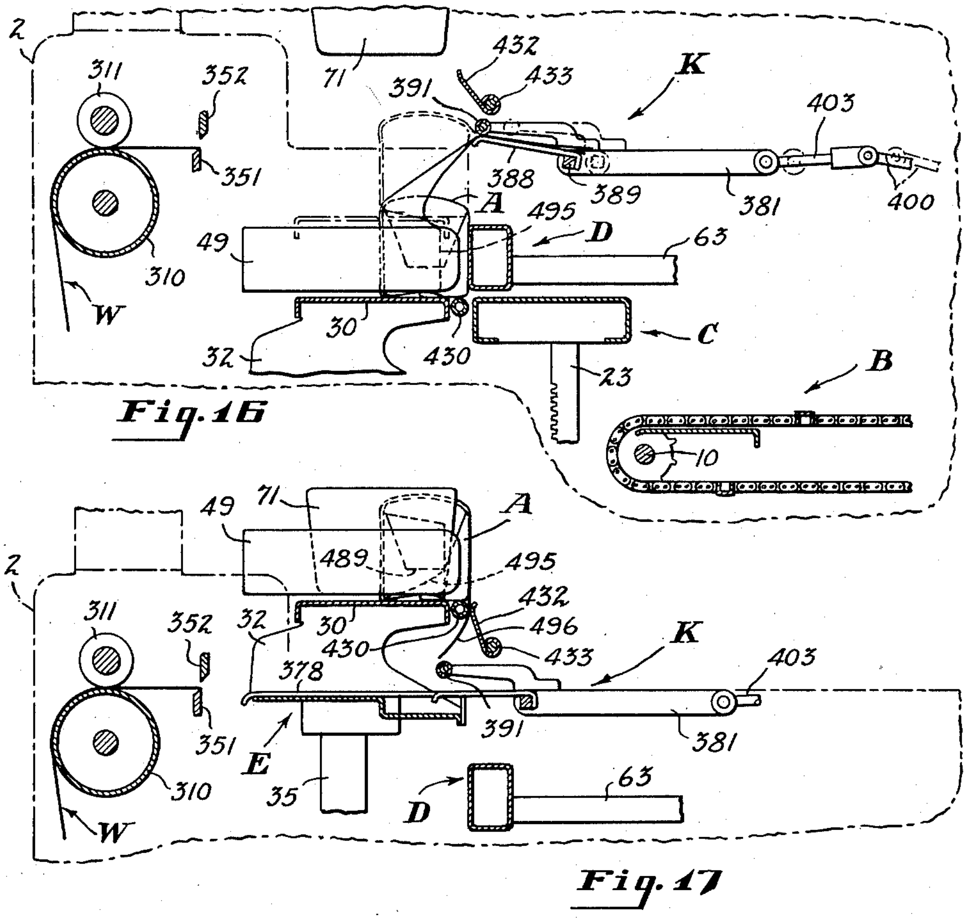

The third movement of the machine cycle is initiated by travel of the main rack bar 220 to the right as viewed from the operator's side, the main crank arm 217 starting from dead center position on the left and gradually accelerating the mechanisms that are driven during the third movement. The intermittent drive clutch 226 rotates the intermittent shaft 223 approximately 180° or a half revolution, the clutch 227 being idle and the brake thereof holding the shaft 222 stationary. The principal operation of the third movement is the transfer of an article from the carrier C onto the carrier E by the pusher D at the transfer station. This step begins with an article A positioned between the side plates 21 and 22 of the carrier C, as shown in Fig. 15, and ends with the article disposed between the end folders 49 on the upper platform 30 of the carrier E, as shown in Fig. 16, the pusher D having reached its limit of movement to the left and having forced the article against the suspended wrapper web W so as partially to withdraw the latter from between the clamping fingers 388 and the gripping roller 391, the bottom portion of the suspended wrapper web being folded under the article.

During the movement of the article onto the upper platform 30 of the carrier E wrapping material portions projecting beyond the ends of the article are engaged by the end folders 49 and partially folded against the ends of the article, the end folders being spread slightly apart approximately to the broken line positions shown in Fig. 6. Rotation of shaft 318 one half revolution during the third movement turns the eccentric 58 to the position shown in Fig. 2, returning the swingable track 51 to the full line position illustrated, and thereby effecting closing movement of the folders 49 against the ends of the article on the carrier E prior to movement of the latter away from the transfer station.

The article transferring movement of the pusher D carries the latter across the entire width of the lift or carrier C the pusher stopping short of the path of the second carrier or lift E so that the latter clears the face of the pusher D when it moves upwardly during the fourth or final movement of the cycle.

Besides the article transferring operation of the pusher D during the third step or movement of the cycle the intermittent shaft 223 actuates the infeed conveyor B to advance an article onto the treadle 490 and actuates the overhead conveyor G to advance by one step any articles in the folding and sealing channel F, particularly to clear the entering end of the folding and sealing channel so that the latter is open to receive the next article lifted to the level of the channel by the carrier E.

Movement of an article onto the treadle 490 by one of the flights 15 of the infeed conveyor causes the treadle to be depressed by the article so as to swing the roller 483 out of the path of the pawl arm 484 thus retaining the driving connection between the shaft 223 and the wrapper feeding mechanism H. The half revolution of the intermittent shaft 223 during the third movement or step of the cycle rotates the wrapper feed and knife operating shaft 318 a half turn, the roller 361 riding up the inclined portion 367 of the cam 319 to raise or reset the knife 352. The connecting rod 321 is raised by the crank 320 during this half revolution of the shaft 318 to ready the wrapper feed arm 324, the feed rolls 310 and 311 being locked against reverse rotation by the one way drive which includes the spring pressed balls or rollers 340. The carriers C and E are held stationary at the transfer station level during this third movement of the wrapping cycle and the control carriage is also stationary in retracted position.

As the main drive crank 217 passes through dead center at the limit of movement of the main drive rack 220 to the right as viewed from the operator's side, the third movement of the cycle is terminated, the moving parts being gradually brought to rest.

*Fourth movement*

Figure 18:
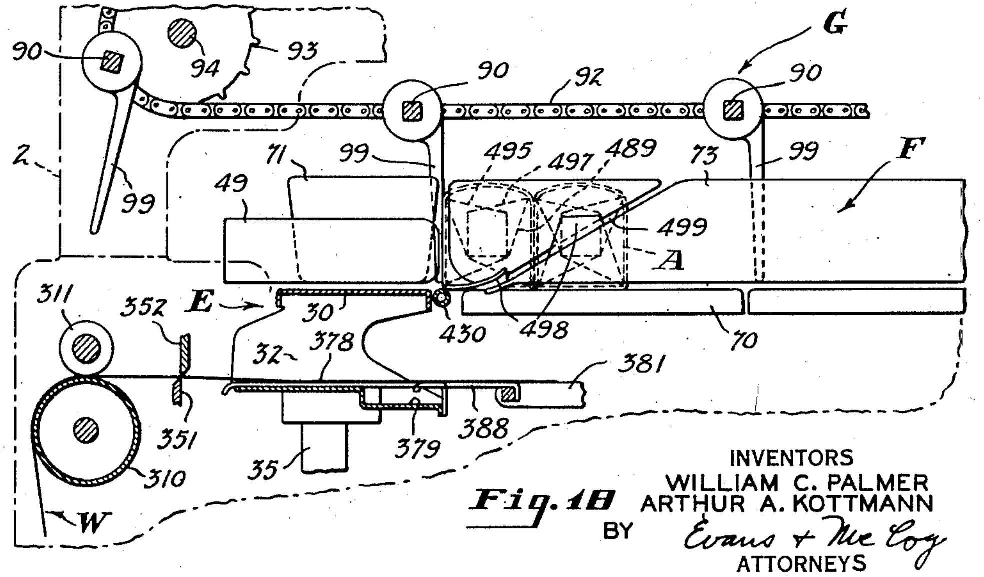

The fourth and final movement of the cycle is also initiated gradually. The parts and mechanisms which moved during the third step or movement are now held stationary and the parts and mechanisms which were idle are now actuated. The overrunning clutch 227 is actuated by movement of the rack bar 220 to the left to rotate the intermittent shaft 222 through approximately 180° or half a revolution while the intermittent shaft 223 is held stationary by the brake in the clutch 226. The final half revolution of the shaft 222 lowers the first carrier or lift C from the transfer station level to the level of the discharge plate 17 of the infeed conveyor B. Simultaneously with the lowering of the first carrier C, the second carrier or lift E is moved upwardly to the level of the folding and sealing channel F, raising the received article from the position shown in Fig. 16 to the position shown in Fig. 17. During the raising of the carrier E the movement of the arm 55 under the control of the roller 52 in the cam groove 53 swings the end folders 49 against the ends of the article to substantially the full line positions illustrated in Fig. 6, the end folders completing first end folds of the wrapping material against the ends of the article and centering the article on the carrier platform 30. The wrapper portion constituting one of the first end folds is indicated at 495 (Figs. 17 and 18).

As the lift or carrier E moves upwardly the wrapping material draped over the article is smoothed down and over the side of the article by the spring pressed pressure fingers 432 which, as shown in Fig. 16, projects into the path of the article so as to engage along the top of the article as the latter moves upwardly and to travel downwardly over the side of the article in a smoothing or stroking action which tends to draw the wrapping material snugly about the article, eliminating wrinkles and compacting the wrapping material against the article.

The top end folders 71 carried by the support members 116 engage wrapping material portions projecting from the top of the article at the ends of the latter as the article moves to its upper limit of travel on the carrier E and folds such projecting wrapper portions down against the ends of the article over the end folders 49. These downwardly folded wrapper portions constitute the top end folds of the wrapper, one of which is indicated at 489 (Figs. 17, 18). When the article is pushed off the carrier E during the subsequent cycle of the machine the relative movement of the end folders 49 withdraws the latter from under the top end folds 489 and the latter are pressed against the first end folds 495 by the folders 72.

A portion of wrapping material 496 depends below the bottom of the article and is engaged between the roller 430 on the carrier and the spring pressed pressure fingers 432 when the carrier reaches its upper limit of movement at the level of the folding and sealing channel. This gripping of the depending portion of the wrapping material retains control of the wrapper, preventing a loose wrap and serves to draw the depending portion 496 of the wrapper web tightly across the bottom of the article when the latter is moved into the folding and sealing channel during the succeeding wrapping cycle.

The infeed conveyor B, overhead conveyor G, pusher D, wrapper feed and cutter or knife, are stationary during the fourth and final movement of the cycle but the wrapper control carriage K is actuated to advance against the stop 414 to draw the fingers 388 away from the clamping roller 391, the fingers becoming interleaved with the rods 378 on the lower level of the carrier E.

As the main crank 217 moves across dead center and the main drive rack 220 reaches its extreme limit of movement to the left as viewed from the operator's side, the mechanisms actuated by the intermittent drive shaft 222 during the fourth movement or final step of the cycle are gradually brought to rest and the first movement or step of the succeeding wrapping cycle is initiated by the gradual movement of the rack 220 to the right actuating the intermittent shaft 223.

*Wrap completion*

In the four movement or step cycle of the present machine an article is introduced into the wrapping mechanism, a length of wrapping material is fed and cut off, the severed wrapping material is draped over the article and partially wrapped thereabout. Completion of the wrapping of the introduced article does not occur until a subsequent cycle of the machine. Thus, although the four steps or movements of the present machine may be referred to as a wrapping cycle it is apparent that each article is not completely processed in one such cycle.

As each succeeding cycle is initiated, the first step or movement thereof corresponding to the first step or movement of the cycle just described, the partially wrapped article previously raised to the folding and sealing channel level by the upper platform 30 of the carrier E is pushed between the side plates or members 72 of the channel by the movement of the overhead conveyor G, the pusher assembly on one of the flight bars 90 engaging one side of the article on the carrier and advancing the same approximately to the position shown in Fig. 18. This movement of the article into the folding and sealing channel forms the second end folds, the edges of the members 72 engaging portions of wrapping material that project beyond the vertical edge corners of the article and folding such portions of wrapping material back against the article ends on top or in overlying relation to the top end folds 489 as the article is moved into the folding and sealing channel. The wrapper portion constituting one of the second end folds is indicated at 497 (Fig. 18). Wrapping material portions projecting from the bottom of the article at both the ends of the latter (one such portion being indicated at 498) are received in the upwardly inclined folding slots 499 between the side members 72 and 73 of the sealing channel. As the article moves along the channel the wrapping material portions 498 travel along the slot 499 and are folded upwardly against the article ends on top of or in overlying relation to the second end folds 497 to complete the wrapping thereof. During the remainder of the article travel through the folding and sealing channel the overlapped wrapper portions are heated by the side and bottom members of the channel to heat-seal the same or to melt the wax coating of the wrapper. The overlapped wrapper portions are held in position about the article during the subsequent movement of the article on the bottom belt 140 and between the side belts thereof, so that the heat-seal is permitted to set or the melted wax is permitted to cool to complete the sealing of the wrapper about the article.

The principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What we claim is:

1. In a wrapping machine having infeed and discharge conveyors of the flight type, carrier means for transferring articles from the infeed conveyor to the discharge conveyor, a reciprocating member, means for actuating the conveyors including an overrunning clutch operably connected to said reciprocating member to be actuated thereby during movement of said member in one direction for imparting intermittent movement to the conveyors with a dwell period after each movement, means for actuating the carrier means including a second overrunning clutch operatively connected to said reciprocating member to be actuated thereby during movement of said member in the opposite direction for imparting intermittent movement to the carrier means with a dwell period after each movement, thereby providing carrier means movement during the dwell period of the conveyors and conveyor movement during the dwell period of the carrier means.

2. In a wrapping machine having an infeed conveyor and a wrapping channel at different levels, means for moving articles through the wrapping channel, a feed carrier and mechanism for reciprocating the same between the conveyor level and an intermediate transfer station level, a receiving carrier and mechanism for reciprocating the same between the transfer station level and the wrapping channel level transfer means for shifting articles from the feed carrier to the receiving carrier at said station, means coordinating the reciprocations of the carriers to provide synchronous movements thereof toward and away from the transfer station, and common drive means for the conveyor, the carriers, the transfer means and the article moving means, said drive means including a rotatable shaft, a rack connected to the shaft to be reciprocated thereby, and drive means including two overrunning clutches arranged for actuation by the rack, one of said clutches being connected to the carriers to move the same intermittently with dwells at the transfer station level and at the conveyor and wrapping channel levels and the other of said clutches being connected to the conveyor, the transfer means, and the article moving means to move the same during the carrier dwells.

3. In a wrapping machine having an infeed conveyor and a wrapping channel at different levels, means for moving articles through the wrapping channel, a feed carrier and mechanism for reciprocating the same between the conveyor level and an intermediate transfer station level, a receiving carrier and mechanism for reciprocating the same between the transfer station level and the wrapping channel level, transfer means for shifting articles from the feed carrier to the receiving carrier at said station, means coordinating the reciprocations of the carriers to provide synchronous movements thereof toward and away from the transfer station, common drive means for the conveyor, the carrier, the transfer means, and the article moving means including a rotatable shaft, and overrunning drive means, the overrunning drive means being arranged to actuate the mechanisms comprising the conveyor, transfer means, and article moving means synchronously and intermittently, and to operate the carriers intermittently and alternately with said mechanisms.

4. In a wrapping machine having mechanisms including article infeed means, wrapping channel, means for advancing articles through the channel, a carrier mounted for reciprocation between the channel and a transfer station at a different level, means for feeding a wrapper to a suspended position adjacent the carrier at the transfer station level, and means for pushing articles from the infeed means into suspended wrapping material and onto the carrier, common drive means for the mechanisms including first intermittent means for actuating the infeed, wrapper feed, pushing means, and advancing means synchronously and in unison with alternate periods of motion and dwell, and second intermittent means for actuating the carrier to move during the dwell of the first intermittent means and to dwell during the motion of the first intermittent means.

5. In a wrapping machine for processing a substantially continuous succession of articles and having mechanisms for moving articles therethrough over substantially horizontal paths and means for moving articles therethrough over a substantially vertical path, common drive means for the article moving means and mechanisms including means for actuating the mechanisms intermittently in unison with alternate periods of motion and dwell, and other means for actuating the article moving means intermittently to move articles during the dwell periods of the mechanisms and to dwell during the motion periods of the mechanisms.

6. In a wrapping machine for processing a substantially continuous succession of article carriers reciprocably mounted for movement over substantially vertical paths to and from a common transfer level, mechanisms for moving articles over substantially horizontal paths, means for feeding a wrapper to a suspended position across one of the horizontal paths substantially at said transfer level, one of the mechanisms being a pusher for transferring articles from one carrier to another at said transfer level, and drive means for actuating the mechanisms intermittently in unison with alternate periods of motion and dwell and for actuating the carriers intermittently in unison with alternate periods of motion and dwell, the motion periods of the mechanism coinciding with the dwell periods of the carriers and vice versa, and means for actuating the wrapper feeding means intermittently in timed relation to the mechanisms and during the motion periods thereof, the pusher operating to move an article into a suspended wrapper during the transfer of such article.

7. In a wrapping machine having mechanisms including article infeed means, a wrapping channel, means for advancing articles through the channel, a carrier mounted for reciprocation between the channel and a transfer station at a different level, means for feeding a wrapper to a suspended position adjacent the carrier at the transfer station level, and means for pushing articles from the infeed means into suspended wrapping material and onto the carrier, drive means for the mechanisms including a shaft making two revolutions for each wrapping cycle of the machine, a first intermittent rotatable drive, operatively connected to said shaft to be actuated thereby for a motion period and a dwell period during each revolution of said shaft, means connecting said rotatable drive to actuate intermittently the infeed means, wrapper feed means, pushing means, and article advancing means, a second intermittent rotatable drive operatively connected to said shaft to be actuated thereby for a motion period during said dwell period and a dwell period during said first mentioned motion period, and means connecting said second rotatable drive to actuate intermittently the carrier so that the carrier and the other mechanisms alternate in movement.

8. In a wrapping machine for processing a substantially continuous succession of articles and having a shaft making two revolutions for each wrapping cycle, an infeed conveyor and a wrapping channel at different levels, means for moving articles through the wrapping channel, a feed carrier and means for guiding the same between the conveyor level and an intermittent transfer station level, a receiving carrier and means for guiding the same between the transfer station level and the wrapping channel level, means for transferring articles from one carrier to the other at said station, means for feeding a wrapper to a suspended position between the carriers at said station, and a four movement drive operatively connected to said shaft, said drive including intermittent rotatable drives alternately actuated by said shaft, one of said intermittent drives being arranged to actuate the carriers to move synchronously toward and away from the transfer station during the second and fourth movements of the drive and another of the intermittent drives being arranged to actuate the other mechanisms during the first and third movements of said drive.

9. In a wrapping machine for processing a substantially continuous succession of articles and having a shaft making two revolutions for each wrapping cycle, an infeed conveyor and a wrapping channel at different levels, means for moving articles through the wrapping channel, a feed carrier and means for guiding the same between the conveyor level and an intermittent transfer station level, a receiving carrier and means for guiding the same between the transfer station level and the wrapping channel level, means for transferring articles from one carrier to the other at said station, means for feeding a wrapper to a suspended position between the carriers at said station, and a four movement drive operatively connected to said shaft, said drive including intermittent rotatable drives alternately actuated by said shaft, and arranged during the first movement to actuate the conveyor to place an article on the feed carrier, to actuate the article moving means to move an article from the receiving carrier into the channel, and to actuate the wrapper feeding means to feed a wrapper, arranged during the second movement to actuate the carriers to move synchronously to the transfer station, arranged during the third movement to actuate the transfer means to shift an article from the feed carrier to the receiving carrier, and arranged during the fourth movement to actuate the carriers to move synchronously to the conveyor and channel levels, the conveyor and the article moving means being stopped during the actuation of the carriers and vice versa.

10. In a wrapping machine having a wrapping mechanism and a carrier for elevating articles into the mechanism, spaced elements on the carrier for receiving an article therebetween and retaining the article in predetermined position during the lifting thereof, means on the carrier for varying the space between said elements, a pusher and means for moving the same in timed relation to the carrier to travel across the carrier and between said elements to push an article off the carrier, said pusher including relatively movable parts and means for adjusting the same to vary the width of the pusher, and unitary control means connected to actuate both the carrier elements space varying means and the pusher width adjusting means simultaneously and in unison while the machine is in operation to adjust the machine to accommodate articles of different sizes whereby the pusher width is maintained in predetermined fixed relation to the space between the carrier elements.

11. In a wrapping machine having a pair of carriers movable simultaneously toward and away from a transfer station, elements on each of the carriers for receiving articles therebetween to retain the articles in predetermined positions on the carriers, means on each of the carriers for varying the spacing between the elements to adjust the carriers to accommodate articles of different sizes, means at the transfer station for pushing an article from one to another of the carriers, said pusher means including parts movable to vary the width of the pusher to permit the latter to pass between the elements of one of the carriers, and a unitary control means connected to actuate simultaneously and in unison the space varying means of the carriers and the pusher parts and including sliding joint means permitting said actuation of the several space and size varying means while the machine is in operation.

12. In a wrapping machine, a wrapping channel and an infeed conveyor at different levels, said infeed conveyor being an endless conveyor with spaced article pushing flights a transfer device at an intermediate level, a feed carrier movable from a receiving position at the infeed conveyor level to a discharging position at the intermediate transfer level, a receiving carrier movable from a receiving position at the transfer level to a discharging position at the wrapping channel level, means for intermittently and simultaneously moving said carriers in opposite directions and for causing each to dwell at its receiving and discharging positions, means for actuating said transfer device during the dwell of said carriers at the transfer level to transfer an article from the feed carrier to the receiving carrier, and intermittently actuated means for advancing the infeed conveyor during each dwell of said carriers.

13. In a wrapping machine having infeed and discharge conveyors at different levels, the infeed conveyor being an endless conveyor with spaced article pushing flights, means for transferring articles from the feed conveyor to the discharge conveyor including a carrier having a substantially flat article receiving surface and mounted for movement into and out of a receiving position at an end of said infeed conveyor, means for intermittently moving said carrier with a dwell at its receiving position and at a point spaced from said receiving position, and intermittently operating driving means for said infeed conveyor for advancing said flight conveyor during each dwell of said carrier.

WILLIAM C. PALMER.
ARTHUR A. KOTTMANN.

REFERENCES CITED

The following references are of record in the file of this patent:

UNITED STATES PATENTS

| Number | Name | Date |
|---|---|---|
| 1,461,760 | Morinsky | July 17, 1923 |
| 1,875,532 | Washburne | Sept. 6, 1932 |
| 2,082,945 | Ferenci | June 8, 1937 |
| 2,092,916 | Hildebrand | Sept. 14, 1937 |
| 2,215,036 | Hartman | Sept. 17, 1940 |
| 2,235,503 | Petskeyes et al. | Mar. 18, 1941 |
| 2,241,721 | Hoppe | May 13, 1941 |
| 2,273,472 | Kottman | Feb. 17, 1942 |
| 2,332,316 | Hexter | Oct. 19, 1943 |
| 2,360,910 | Tone | Oct. 24, 1944 |